US012761145B2

United States Patent

(12) United States Patent
Seren et al.

(10) Patent No.: US 12,761,145 B2
(45) Date of Patent: Oct. 13, 2026

(54) THERMOMECHANICAL INFRARED DETECTOR WITH METAMATERIAL ABSORBER

(71) Applicant: Saudi Arabian Oil Company, Dhahran (SA)

(72) Inventors: Huseyin Rahmi Seren, Houston, TX (US); Miguel Gonzalez, Houston, TX (US)

(73) Assignee: Saudi Arabian Oil Company, Dhahran (SA)

( * ) Notice: Subject to any disclaimer, the term of this patent is extended or adjusted under 35 U.S.C. 154(b) by 214 days.

(21) Appl. No.: 18/675,680

(22) Filed: May 28, 2024

(65) Prior Publication Data

US 2025/0369877 A1 Dec. 4, 2025

(51) Int. Cl.

*G01N 21/35* (2014.01)
*G01N 21/25* (2006.01)
*G01N 21/3504* (2014.01)
*G01N 21/17* (2006.01)

(52) U.S. Cl.

CPC ....... *G01N 21/3504* (2013.01); *G01N 21/255* (2013.01); *G01N 2021/1704* (2013.01); *G01N 2021/1708* (2013.01)

(58) Field of Classification Search

CPC ............. G01N 21/3504; G01N 21/255; G01N 2021/1704; G01N 2021/1708; G01N 29/036; G01N 2291/0427; G01N 21/1702

See application file for complete search history.

(56) References Cited

U.S. PATENT DOCUMENTS 4,384,232 A * 5/1983 Debely .................. H03H 9/215 310/368
11,073,469 B2 7/2021 Dong et al.
2009/0174884 A1* 7/2009 Kosterev ............ G01N 29/2418 356/432

FOREIGN PATENT DOCUMENTS

CN 106124411 A * 11/2016 ......... G01N 21/3504
CN 115494018 12/2022
CN 115494018 A * 12/2022 ............. G01N 21/01
CN 118032658 A * 5/2024 ............. G01N 21/84

OTHER PUBLICATIONS

Lin et al (Year: 2022).*
Ma et al. (Year: 2024).*
He et al. (Year: 2022).*
Cantatore et al., Lithium Niobate—Enhanced Photoacoustic Spectroscopy, Photoacoustics, Feb. 2024, 35:100577, 6 pages.
Jha et al., "Non-Dispersive Infrared Gas Sensing Technology: A Review," IEEE Sensors Journal, Jan. 2022, 22(1), 10 pages.

* cited by examiner

*Primary Examiner* — Hwa Andrew Lee
(74) *Attorney, Agent, or Firm* — DINSMORE & SHOHL LLP

(57) ABSTRACT

An infrared detector includes a tuning fork resonator comprising an mechanical-to-electrical transduction mechanism; a metamaterial absorber residing on at least one side of the tuning fork resonator, the metamaterial absorber comprising at least a material layer with subwavelength inclusions; and a signal processing circuit to translate the electrical signal into an amplitude of mechanical motion of the tuning fork.

23 Claims, 14 Drawing Sheets

500
308
306
308
A-A
A
402
404
104a
104b
200
311
313
310
312
315
317
314
316

THERMOMECHANICAL INFRARED DETECTOR WITH METAMATERIAL ABSORBER

FIELD

This disclosure pertains to a thermomechanical infrared detector with a metamaterial absorber for analyte detection.

BACKGROUND

Steam methane reformation is a major source of hydrogen production. This steam methane reformation method is currently the most economic hydrogen production technique, and sustainability of steam methane reformation method for hydrogen production is desirable. Steam methane reformation a process that uses natural gas to produce hydrogen and carbon monoxide. Methane from natural gas is heated, with steam, usually with a catalyst, to produce a mixture of carbon monoxide and hydrogen used in organic synthesis and as a fuel.

SUMMARY

The present disclosure describes techniques that can be used for detecting an analyte, such as methane or hydrogen, using a thermomechanical infrared detector with a metamaterial absorber.

In some implementations, a computer-implemented method includes the following.

Aspects of the implementations are directed to an infrared detector that includes a tuning fork resonator including an mechanical-to-electrical transduction mechanism; a metamaterial absorber residing on at least one side of the tuning fork resonator, the metamaterial absorber including at least a material layer with subwavelength inclusions; and a signal processing circuit to translate the electrical signal into an amplitude of mechanical motion of the tuning fork.

In some implementations, the mechanical-to-electrical transduction mechanism include a piezoelectric substrate; electric contact pads; and electrodes configured to conduct charge from movement of the piezoelectric substrate to the electric contact pads.

In some implementations, the mechanical-to-electrical transduction mechanism includes an optically transparent material; a laser; a photodetector; and wherein the tuning fork includes a tine that includes a partially reflecting mirror.

In some implementations, metamaterial absorber includes a metal resonator antenna layer with subwavelength features; a dielectric layer under the resonator antenna layer; and a metal ground plane layer under the dielectric layer.

In some implementations, the resonator antenna layer is characterized by a broad absorption spectrum.

In some implementations, the resonator antenna layer is characterized by a narrow absorption spectrum.

In some implementations, metamaterial absorber includes a metal layer includes of subwavelength nanoparticles.

In some implementations, the metamaterial layer includes a plurality of islands, each metal island including a size and/or a geometry based on a desired absorption spectrum linewidth and/or strength.

In some implementations, the plurality of islands includes dielectric islands.

In some implementations, the plurality of islands includes semiconductor islands.

Some implementations include a first tine extending from a base; and a second tine extending from the base opposite the first tine; wherein the first and second tines being configured to deform based on a mechanical stress imposed on the tuning fork body through absorbed infrared light.

Some implementations include an optical cavity, the optical cavity including a first optical element on an inner surface of the first tine; and a second optical element on an inner surface of the second tine, the first optical element opposite the second optical element.

In some implementations, the first optical element includes a partially reflecting thin metal coating; the second optical element includes a partially reflecting thin metal coating. The infrared detector can also include a laser coupled to an outer surface of the first tine at a location opposite the first optical element; and a photodetector coupled to an outer surface of the second tine at a location opposite the second optical element, the photodetector coupled to an output electrode for communicating a signal from the photodetector, wherein the laser is configured to emit light through the first optical element and the second optical element and onto the photodetector.

In some implementations, the first optical element includes a partially reflecting thin metal coating; the second optical element includes a reflecting thin metal coating. The infrared detector can include a laser coupled to an outer surface of the first tine at a location opposite the first optical element, the laser is configured to emit light through the first optical element; and a photodetector coupled to the outer surface of the first tine at a location opposite the first optical element, the photodetector coupled to an output electrode for communicating a signal from the photodetector, and the photodetector is configured to receive light reflected from the first optical element and light reflected from the second optical element.

Implementations can also include a first electrode on the first tine extending from the base; and a second electrode on the second tine extending from the base; wherein the first electrode and the second electrode carry a charge based on the deformation of the first tine and the second tine.

Aspects of the embodiments include receiving, from a testing chamber containing an analyte, modulated infrared light at a metamaterial absorber layer of a tuning fork resonator, the modulated infrared light causing the tuning for resonator to vibrate at a frequency based in part on a modulation frequency of the infrared light and with an intensity corresponding to a concentration of the analyte present in the testing chamber; receiving an electrical signal representative of the intensity of the vibration of the tuning fork resonator; determining the concentration of the analyte based on a comparison of the received electrical signal and a reference signal.

In some implementations, the electrical signal representative of the amplitude of the vibration of the tuning fork resonator includes an electrical signal generated from a piezoelectric effect, the piezoelectric effect causing charge to flow through an electrode based on a deformation of a tine during vibration of the tuning fork resonator.

In some implementations, the electrical signal representative of the amplitude of the vibration of the tuning fork resonator includes an electrical signal generated from a photodetector receiving light reflected from an optical cavity formed on two tines of the tuning fork resonator.

In some implementations, the concentration of the analyte is based in part on an interference pattern detected by the photodetector.

Some implementations include actuating a laser coupled to a tine of the tuning fork resonator; detecting, by the photodetector, the light originating from the laser and output from the optical cavity; and determining an amplitude of the vibration of the tuning fork resonator based on the interference pattern detected from the detected light originating from the laser, wherein the intensity of the vibration of the tuning fork corresponds to an intensity of infrared light absorbed by the metamaterial absorber; and determining a concentration of analyte from the intensity of the vibration of the tuning fork.

Aspects of the implementations are directed to a system that includes a metamaterial thermomechanical detector including a metamaterial absorber residing on at least one side of the metamaterial thermomechanical detector; a infrared light emitter; an analyte test chamber configured to contain an analyte; an infrared light emitter controller configured to provide a modulation signal for modulating emission of infrared light from the infrared light emitter; and a signal analysis circuit. The signal analysis circuitry to receive an electrical signal from the metamaterial thermomechanical detector, the electrical signal representative of a vibrational intensity of the metamaterial thermomechanical detector, determine an intensity of infrared light of a predetermined frequency based on the received electrical signal, and determine a concentration of the analyte in the analyte test chamber based on the determined intensity of infrared light.

In some implementations, the metamaterial absorber includes a resonator antenna layer, a dielectric layer under the resonator antenna layer, and a metal ground plane layer under the dielectric layer; wherein the resonator antenna layer includes a plurality of islands, each metal island including a size and/or a geometry based on a desired absorption spectrum linewidth and/or strength.

In some implementations, the metamaterial thermomechanical detector includes an optical cavity including two opposing reflective surfaces; a laser configured to emit light towards the optical cavity; and a photodetector configured to detect light and convert light to an electrical signal; wherein the signal analysis circuit including circuitry to receive an electrical signal from the metamaterial thermomechanical detector receives electrical signals from the photodetector, the electrical signals representative of an interference pattern that indicates the intensity and frequency of the vibration of the metamaterial thermomechanical detector; and wherein the signal analysis circuit is configured to determine the concentration of the analyte based in part on the interference pattern.

In some implementations, the metamaterial thermomechanical detector includes a first piezoelectric electrode; and a second piezoelectric electrode; wherein the first piezoelectric electrode and the second piezoelectric electrode are configured to carry electrical charge created from a deformation of the metamaterial thermomechanical detector during vibration; and wherein the electrical charge created from the deformation of the metamaterial thermomechanical detector during vibration is representative of the amplitude and frequency of the vibration, and wherein determining the concentration of the analyte includes determining an intensity of light based on the intensity of the vibration from the electrical charge.

The subject matter described in this specification can be implemented in particular implementations, so as to realize one or more of the following advantages. For example, the use of metamaterials can increase the absorption of infrared light from the analyte chamber, thereby increasing the sensitivity of the thermomechanical IR detector. The metamaterials can be engineered to have a narrowband IR absorption to increase the specificity of the detector towards a target gas. In addition, sensitivity can be improved by transducing mechanical vibration to an electrical signal via optical interferometry.

The details of one or more implementations of the subject matter of this specification are set forth in the Detailed Description, the accompanying drawings, and the claims. Other features, aspects, and advantages of the subject matter will become apparent from the Detailed Description, the claims, and the accompanying drawings.

BRIEF DESCRIPTION OF THE DRAWINGS

Like reference numbers and designations in the various drawings indicate like elements. Drawings are not to scale.

DETAILED DESCRIPTION

Figure 1A:
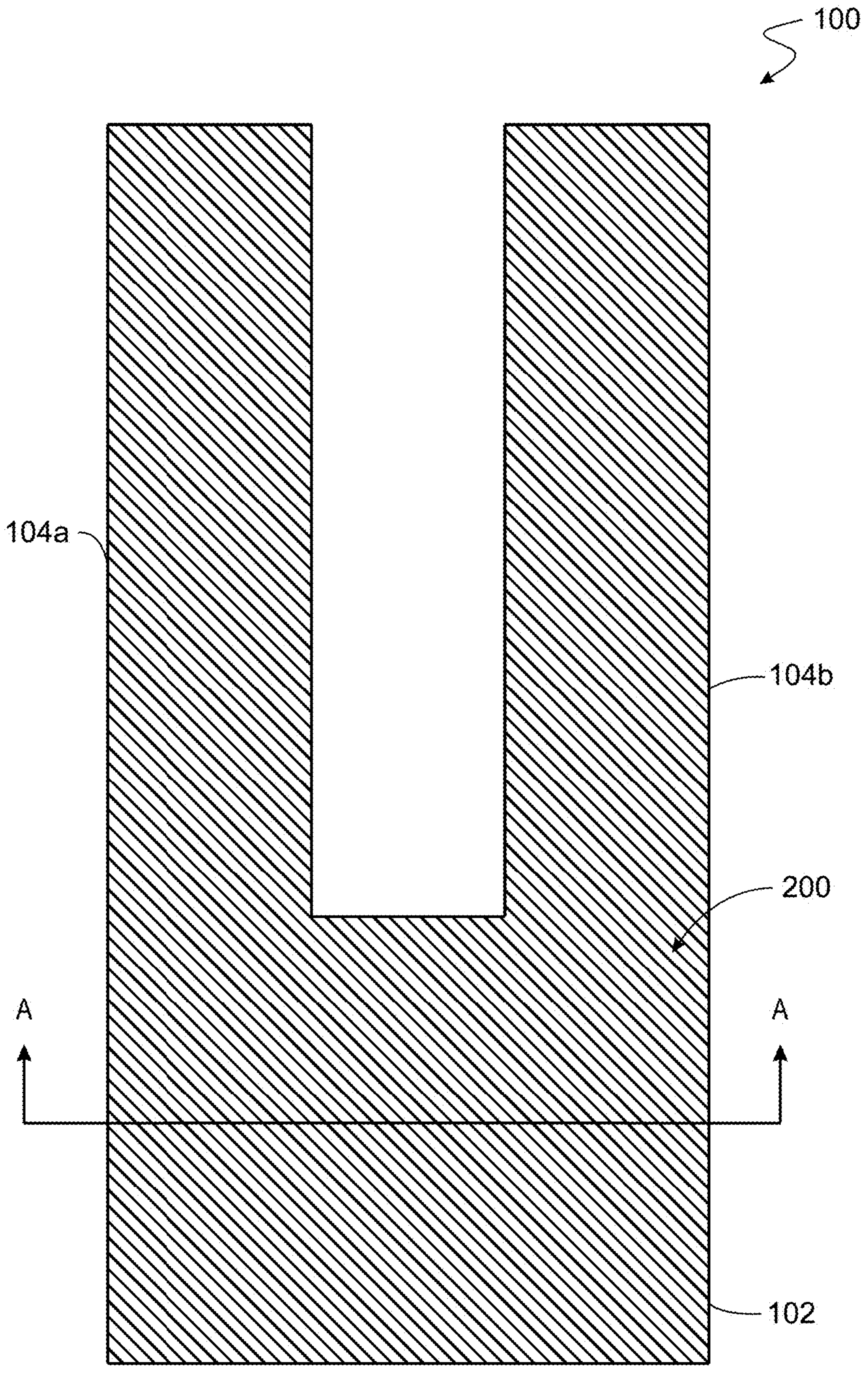
FIGS. 1A-1B are schematic diagrams illustrating different views of an example thermomechanical infrared detector that includes a metamaterial absorber in accordance with some implementations of the present disclosure.

The following detailed description describes techniques for detecting an analyte, such as a gaseous analyte, using a thermomechanical infrared detector that includes a metamaterial absorber. Various modifications, alterations, and permutations of the disclosed implementations can be made and will be readily apparent to those of ordinary skill in the art, and the general principles defined may be applied to other implementations and applications, without departing from scope of the disclosure. In some instances, details unnecessary to obtain an understanding of the described subject matter may be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

As the energy transition towards alternative energies takes place, there will be an increasing need for developing miniaturized low-cost sensors with ample sensitivity for the expanding methane and hydrogen production facilities and distribution infrastructure. The monitoring need includes detection of gas leaks from facilities and infrastructure (e.g., methane or hydrogen), in-line impurity gas quantification in hydrogen streams, and underground storage integrity monitoring.

Hydrogen production through steam methane reformation generates CO2, which needs to be captured and sequestered for reduced emissions. Also, methane is known to be a greenhouse gas and leaks happening in the process cycles need to be prevented. The leaks of methane can be mitigated by implementing advanced sensing and monitoring technologies to quickly detect and repair leak sources.

Produced hydrogen also needs to be closely monitored for leaks. Hydrogen gas is the smallest molecule and has high potency for leaking. It also causes embrittlement of steel increasing the chance of potential failures in the infrastructure. Hydrogen leaks can be dangerous in various ways such as causing fires, explosions, and asphyxiation.

For sustainable hydrogen production by steam methane reformation, or by other techniques, there will be an increasing need for developing miniaturized low-cost sensors with ample sensitivity for the expanding methane and hydrogen production facilities and distribution infrastructure. The monitoring need includes detection of gas leaks from facilities and infrastructure (e.g., methane or hydrogen), in-line impurity gas quantification in hydrogen streams, and underground storage integrity monitoring.

While there are many gas sensing modalities, spectroscopic techniques stand out for their precision, safety, and ability to work in harsh environments. Since only light interacts with the medium, sensitive equipment such as light source, filters, and detectors can be well protected, which in turn enhances the product life and decreases the maintenance requirements.

Figure 14:
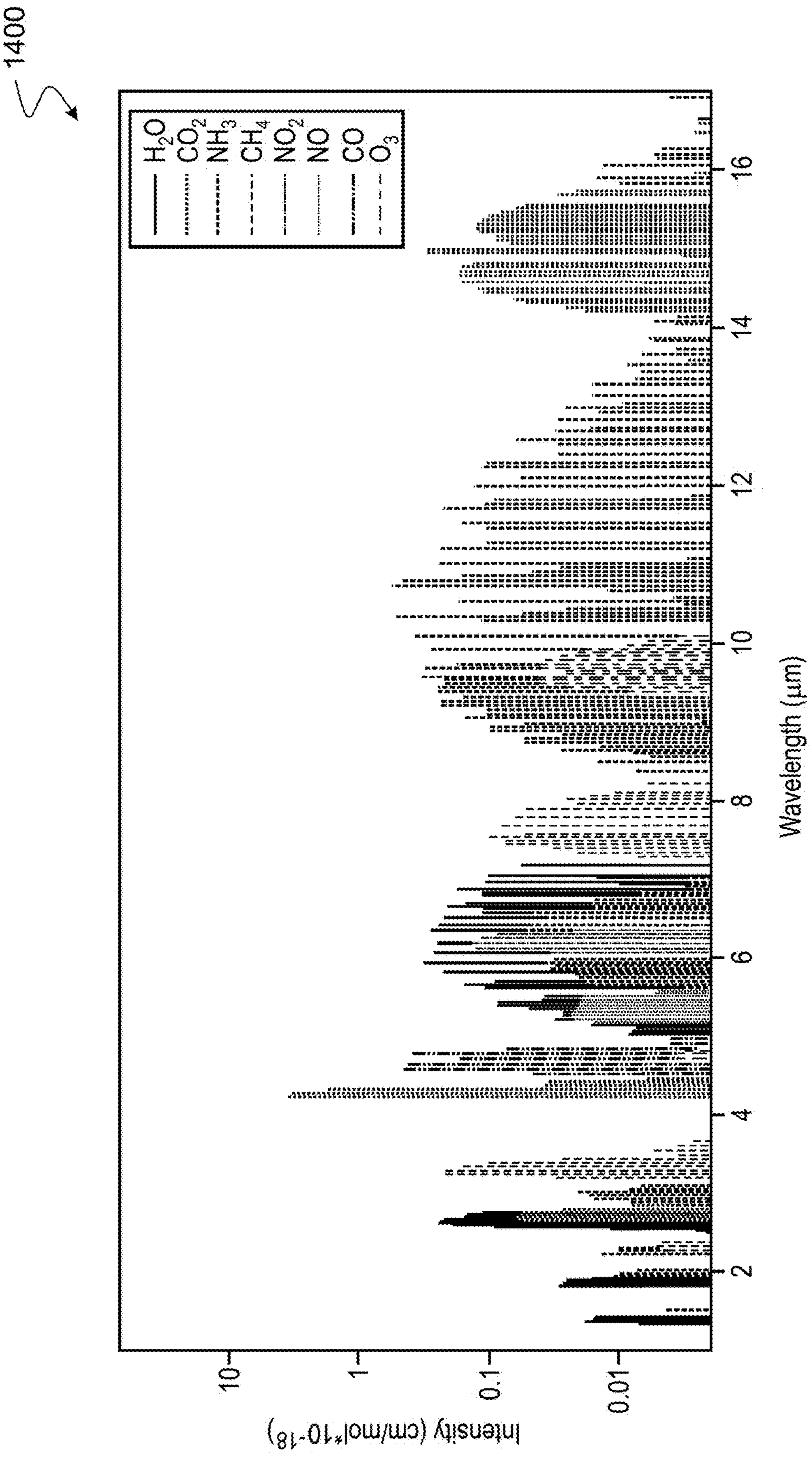
FIG. 14 is a graphical representation of absorption spectra for various analyte molecules from emission in the mid-infrared range.

Most gas molecules have unique absorption bands in the infrared (IR) region of the optical spectrum (as shown by example in FIG. 14). The sensing technique that uses this property is commonly called non-dispersive infrared (NDIR) gas sensing. IR emitters and detectors play a crucial role to make NDIR gas sensors that can detect presence and quantity of these gasses. Although there are several NDIR methane sensors, this is not the case for Hydrogen. Hydrogen has very weak absorption bands in the IR that makes it especially challenging to use NDIR sensing, however it's still possible by increasing the absorption path length and/or increasing the IR sensor sensitivity (or detectivity).

This disclosure describes a metamaterial thermomechanical detector with improved absorption of the IR light on the detector surface that is eventually converted to an electrical signal by using a metamaterial absorber layer. In addition, this disclosure describes system and techniques to improve the transduction efficiency of the detector from mechanical to electrical domain.

In order to improve the absorption, a metamaterial absorber is added to the thermomechanical IR detector. The metamaterial absorber can be designed as a perfect (or near perfect) absorber of IR light for one or more IR frequencies. The metamaterial thermomechanical (MMTM) detector, therefore, is a mechanical resonator with a high quality factor (>100) that includes a metamaterial IR absorber. The metamaterial thermomechanical detector is excited at its resonance frequency by modulating the IR light at this frequency. For example, the light is turned on and off at 40 kHz if the resonance frequency of the mechanical resonator is 40 kHz. There is also electromagnetic frequency of the IR light. This frequency, or wavelength, matches the absorption wavelength of the target gas and the perfect absorber's peak absorption frequency.

In some implementations, a thermomechanical infrared detector can include a metamaterial absorber to increase the absorption of infrared light received by the thermomechanical infrared detector. FIG. 1A is a schematic diagram of an example thermomechanical infrared detector 100 that includes a metamaterial absorber in accordance with some implementations of the present disclosure. The thermomechanical infrared detector with metamaterial absorber is also referred to herein as a metamaterial thermomechanical (MMTM) absorber or a tuning fork resonator with a metamaterial absorber.

Thermomechanical infrared detectors provide a viable alternative to the previously mentioned IR detectors. In general, a thermomechanical detector absorbs the IR light and deflects or deforms as a result of the temperature change. For example, absorbing IR light can increase the temperature of the thermomechanical IR detector. By modulating the IR light, the resulting variation of temperature over time causes the tines of the thermomechanical IR detector to vibrate. By controlling the modulation frequency of the emitted IR light to match or nearly match the resonant frequency of the thermomechanical IR detector, the absorption of IR light can cause the tines of the thermomechanical IR detector to vibrate at or near resonant frequency.

Figure 1B:
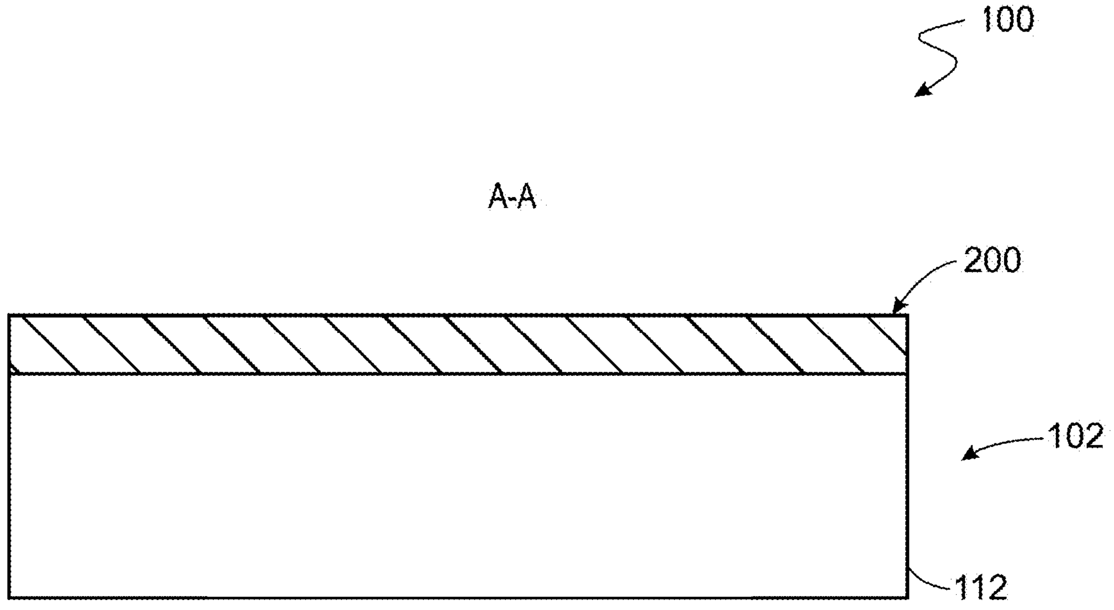

An example device working based on this principle is shown in FIGS. 1A-B, where the metamaterial thermomechanical detector is a tuning fork resonator. The front side of the tuning fork is coated with a metamaterial perfect absorber. The metamaterial coating can cover the whole surface, or it can be partial coverage of the surface. The absorber is typically a metal-insulator-metal (MIM) absorber as in the example shown in FIG. 2. However, other metamaterial layouts are also possible. For example, sub-wavelength metal nanoparticles can be drop-casted to create an absorber film on the tuning fork resonator. When a piezoelectric material used for the resonator, the backside of the tuning fork may have the electrodes that can pick up charge generated due to bending of the tines (examples shown in FIGS. 3-4 and 8). In some embodiments, optical interferometry can be used to detect the mechanical motion in which case a piezoelectric material is not needed.

The principle underlying the metamaterial thermomechanical detector 100 is a gas sensing method that uses light-induced thermoelastic spectroscopy (LITES). After absorbed by target gas, the modulated beam laser hits the metamaterial thermomechanical detector 100 surface, thereby generating a modulated localized heating. The temperature changes in metamaterial thermomechanical detector 100 induced by photothermal conversion results in thermoelastic expansion and contraction. These light-induced deformations on a piezoelectric material, once again, generate a charge distribution that can be collected by the metal pattern, generating an electrical signal which results proportional to the portion of absorbed light from the gas sample. In LITES, metamaterial thermomechanical detectors 100 can operate as a narrow-bandwidth (1 Hz), fast-response (tens of kHz), broadband, high-responsivity infrared photodetector, suitable for tunable laser-based absorption spectroscopy for the remote and standoff trace gas detection and can be used in some harsh conditions such as combustion field.

As shown in FIG. 1A, the metamaterial thermomechanical detector 100 can be shaped like a tuning fork, hence also being referred to as a tuning fork resonator. FIGS. 5A-E and FIG. 6 illustrate example techniques for forming the metamaterial thermomechanical detector 100. The metamaterial thermomechanical detector 100 can include a base 102 and a first tine 104*a* and a second tine 104*b*. The thermomechanical IR detector can include a substrate 112 (shown in the cross-sectional view in FIG. 1B) made from a piezoelectric and/or optically transparent material such as quartz, sapphire, silicon dioxide, or lithium niobate. Other materials can also be used. In general, single crystal materials with least number of defects in their crystal structure are preferable, but the thermomechanical IR detector described herein is not limited to the aforementioned materials. Quartz, silicon, and lithium niobate are also some commonly used materials. Such materials have less intrinsic losses compared to amorphous or composite materials. Small intrinsic loss means a high quality factor tuning fork which can be driven with less input energy at its resonance. The implication is that a high quality-factor tuning fork can be excited with less powerful light sources.

The first tine 104*a* and second tine 104*b* can vibrate like a tuning fork based on the absorption of modulated IR light. The absorption of IR light can cause a temperature change on the tuning fork resonator. For example, a temperature change can occur on one or more of the tines, and/or at other locations on the tuning fork resonator, including the stem. As mentioned before, induced mechanical stress due to temperature changes in various locations of the tuning fork causes mechanical deformation of the tines 104*a* and 104*b*. By modulating the IR light, the temperature change also modulates and therefore the mechanical deformation modulates. The modulation frequency of the IR light can be tuned to match the resonant frequency of the metamaterial thermomechanical detector. The described metamaterial thermomechanical detector 100 is a mechanical resonator with a high quality factor (>100). The metamaterial thermomechanical detector 100 can be excited at its resonance frequency by modulating the emitted IR light at or near this frequency. For example, the emitted IR light is turned on and off (modulated) at 40 kHz if the resonant frequency of the metamaterial thermomechanical detector 100 is 40 kHz.

The thermomechanical detector does not need cooling, and they can be made very sensitive. Since they work based on conversion of IR light to heat, the conversion efficiency becomes important. High IR absorbing materials have been employed including custom designed metamaterials. A metamaterial absorber can be engineered to include materials that can achieve well-tailored electric and magnetic properties so that their interaction with light can be controlled. For example, the absorption, reflection, and transmission spectra of a metamaterial absorber can be engineered to optimize absorption. Even exotic behaviors that are not commonly found in natural materials were achieved such as negative refraction, magnetic response above radio frequencies, or perfect absorption. Commonly, metamaterials are composite materials that are composed of resonant inclusions whose size on at least one dimension is subwavelength, or many times smaller than the electromagnetic wavelength. The subwavelength resonant structures can be acquired through patterning a dielectric (e.g. SiO2, SiN2 etc.), a metal (e.g. Au, Al, Ag, Cu, etc.), a semiconductor (e.g., Si, SiC, GaAs etc.) or a patterned combination of these materials on a solid substrate. The interaction between the electromagnetic radiation and these materials can be in different forms depending on the complex dielectric function of the material and the wavelength of the radiation such as through excitation of conduction band electrons, plasmon generation, spoof plasmon induction, or dielectric polarization.

Figure 2:
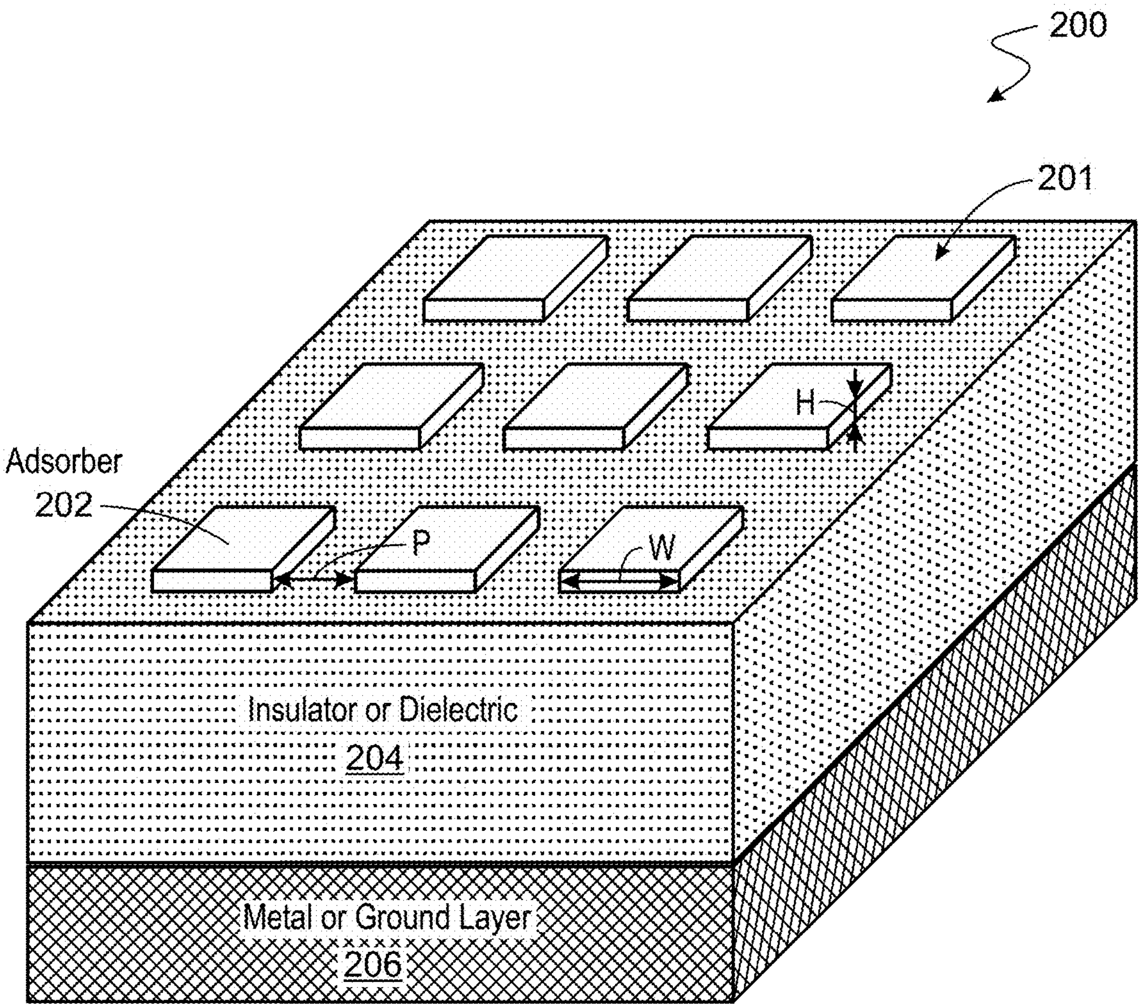
FIG. 2 is a schematic diagram of a partial cross-sectional view of a metamaterial absorber in accordance with some implementations of the present disclosure.

FIGS. 1A-1B also illustrate that the metamaterial thermomechanical detector 100 includes a metamaterial absorber 200. When the absorber absorbs the light, it heats up. A significant part of the heat is transferred to the detector via conduction. An example metamaterial absorber is shown in FIG. 2. FIG. 2 is a schematic diagram of a partial cross-sectional view of a metamaterial absorber in accordance with some implementations of the present disclosure. Metamaterials can be defined as an array of resonator antennae. The antennae are usually made of metal but can be also dielectric, or a combination of dielectric and metal. Metamaterial absorbers can be designed such that they can absorb close to 100% of the incident light at one wavelength or a band of wavelengths.

The metamaterial absorber of FIG. 2 is a metal-insulator-metal (MIM) absorber and is made up of a metal resonator antennae layer 201, a dielectric layer 204, and a metal ground plane layer 206. The metal resonator antennae layer 201 is made up of a plurality of metal islands 202. In this case, the islands are made up of metal, but other materials can also be used. Various metals such as gold, silver, aluminum, copper, etc. can be used to construct the resonators and the ground plane. The function of the metal resonators can be also achieved using semiconductors such as Si or GaAs. Localized surface plasmon resonance becomes excited in metal resonators whereas Mie resonances are observed in semiconductor or dielectric resonators in the THz, IR, or visible regimes of the electromagnetic spectrum. In terms of materials, best composition would be using a metal or alloy of metals that have a plasmonic response in the infrared (IR) where target gasses have absorption bands. Common examples are gold, aluminum, silver, or copper. These materials have high conductivity which makes it possible to make plasmonic metamaterials in infrared. In terms of structure a metal-insulator-metal perfect absorber would be the best to absorb maximum possible light.

In addition, the metal islands 202 are shown to be rectangular in shape. However, the overall shape, pitch, and number of islands can be controlled based on the desired absorption characteristics of the metamaterial absorber 200. By engineering the size of the metal islands 202 and the thickness of the dielectric layer 204, the IR absorption wavelength can be tuned and optimized. The rectangular island geometry can be replaced with other resonator geometries such as split ring resonator (SRR), cross, ring, ring-disk cavity, bow-tie, dimer, oval, disk, etc. These various geometries can provide various absorption linewidths and strengths. Inherent properties such as conductivity (or complex dielectric function) of the metal also affects the device behavior. The dielectric layer can be, for example, silicon dioxide, silicon nitride, polyimide, etc.

The metamaterial absorber 200 can be engineered to have a broadband absorption or narrow-band absorption depending on the sensing application. In spectroscopic sensing, the IR source wavelength can be scanned over a range of values and most of the light in this range of wavelengths is absorbed by the broadband metamaterial. A narrowband absorber can be used to target single gas detection. In this case, especially if the source has a relatively broader wavelength content, the absorber can act also as an optical filter. This eliminates the detection of light that interacts with gasses other than the target gas. Therefore, it increases the selectivity of the measurement. The metamaterial absorber 200 may have a broad absorption spectrum. This broad spectrum use case is useful for spectrometric measurements such that the light wavelength is scanned over a spectrum and light absorption is measured at multiple wavelengths. Thus, multiple gas species can be detected.

The absorber resonators are typically in tens of nanometers to a few micrometers in size. This requires micro/nanofabrication techniques. Various fabrication techniques exist to pattern structures with nanometric and micrometric features. For example, to form a MIM absorber on the resonator, the surface can be coated with a metal layer and an insulator layer. Coating of these materials can be accomplished using one of the physical evaporation, chemical vapor deposition, atomic layer deposition, sputtering, electroplating, spraying, spin-coating, dip-coating, or any known coating technique. The patterned top metal layer can be formed in various ways. For example, a metal layer can be coated on top of the dielectric layer. Then a photoresist can be coated on the metal layer and patterned using photolithography, e-beam lithography, or ion-beam lithography. The photoresist can be used as a mask to selectively etch the top metal layer in the desired shape. Alternatively, lift-off technique can be used. First, a photoresist is patterned on the dielectric surface to create a masking layer using one of the lithography techniques mentioned above. Then, a metal layer can be deposited on the photoresist layer. This allows metal to stick on the selected surfaces on the dielectric layer. Metal coating that lands on the photoresist can be removed using a solvent. To increase the adhesion of the metal layers to the other materials, an adhesion layer can be also added. For example, chromium and titanium are commonly used adhesion metals for gold, silver, and copper. A very thin (<10 nm) adhesion layer can be used to improve the adhesion of the metal and dielectric films together.

Other types of metamaterial layouts can be also used to improve the light absorption. Although MIM type absorbers provide very good absorption, they are harder to fabricate. A simpler solution is using nanoparticle suspensions. Sub-wavelength nanoparticles can be suspended in a solvent and the suspension can be drop-casted on the resonator surface. Once the solvent evaporates, the nanoparticles form a film. The nanoparticle size and material can be selected to match the absorption wavelength to the light wavelength. Particle size distribution determines the absorption bandwidth. If a larger bandwidth is desired, a larger size distribution can be used.

Figure 3:
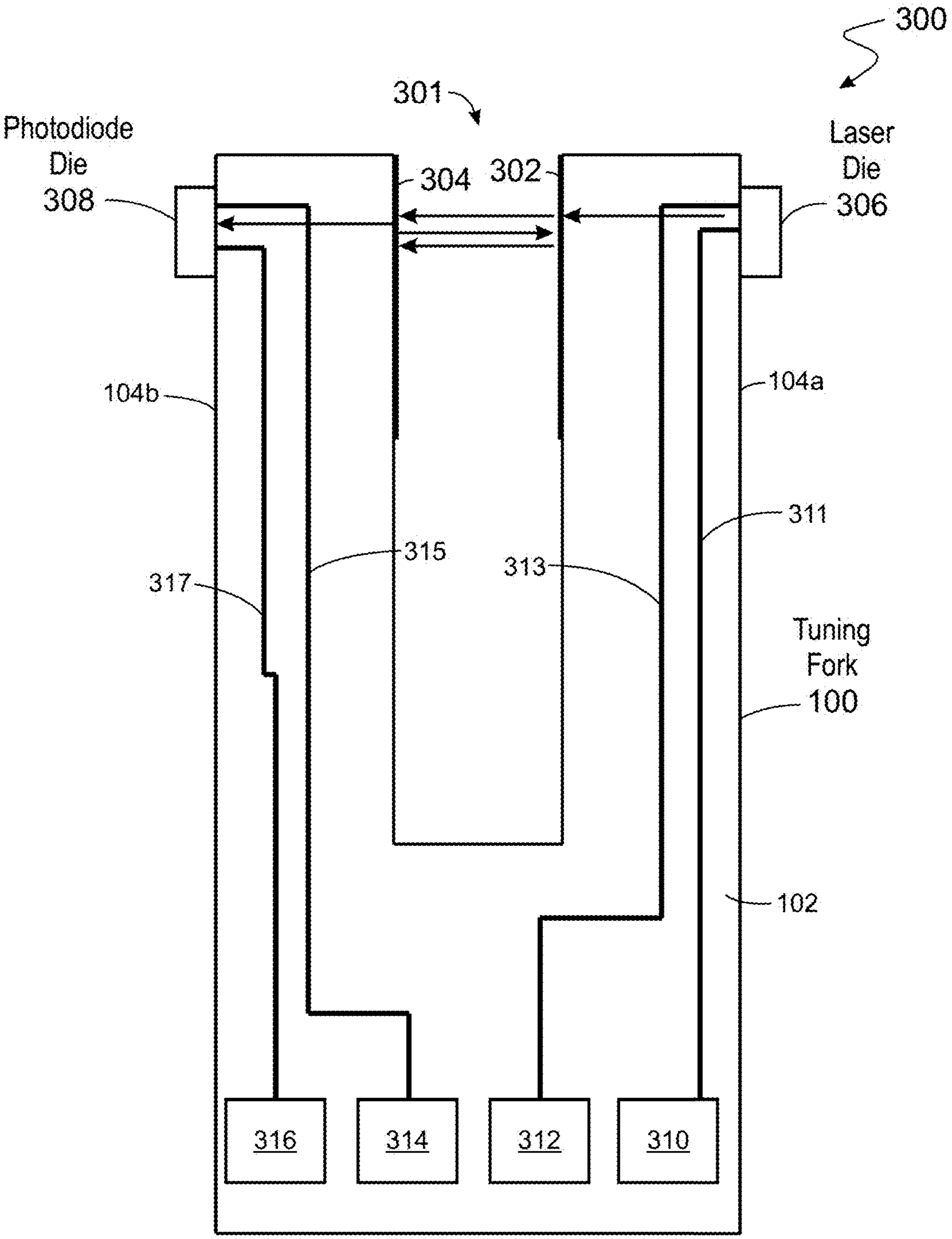
FIG. 3 is a schematic diagram of an example metamaterial thermomechanical detector with an optical cavity and optical components in a first configuration in accordance with some implementations of the present disclosure.
Figure 4:
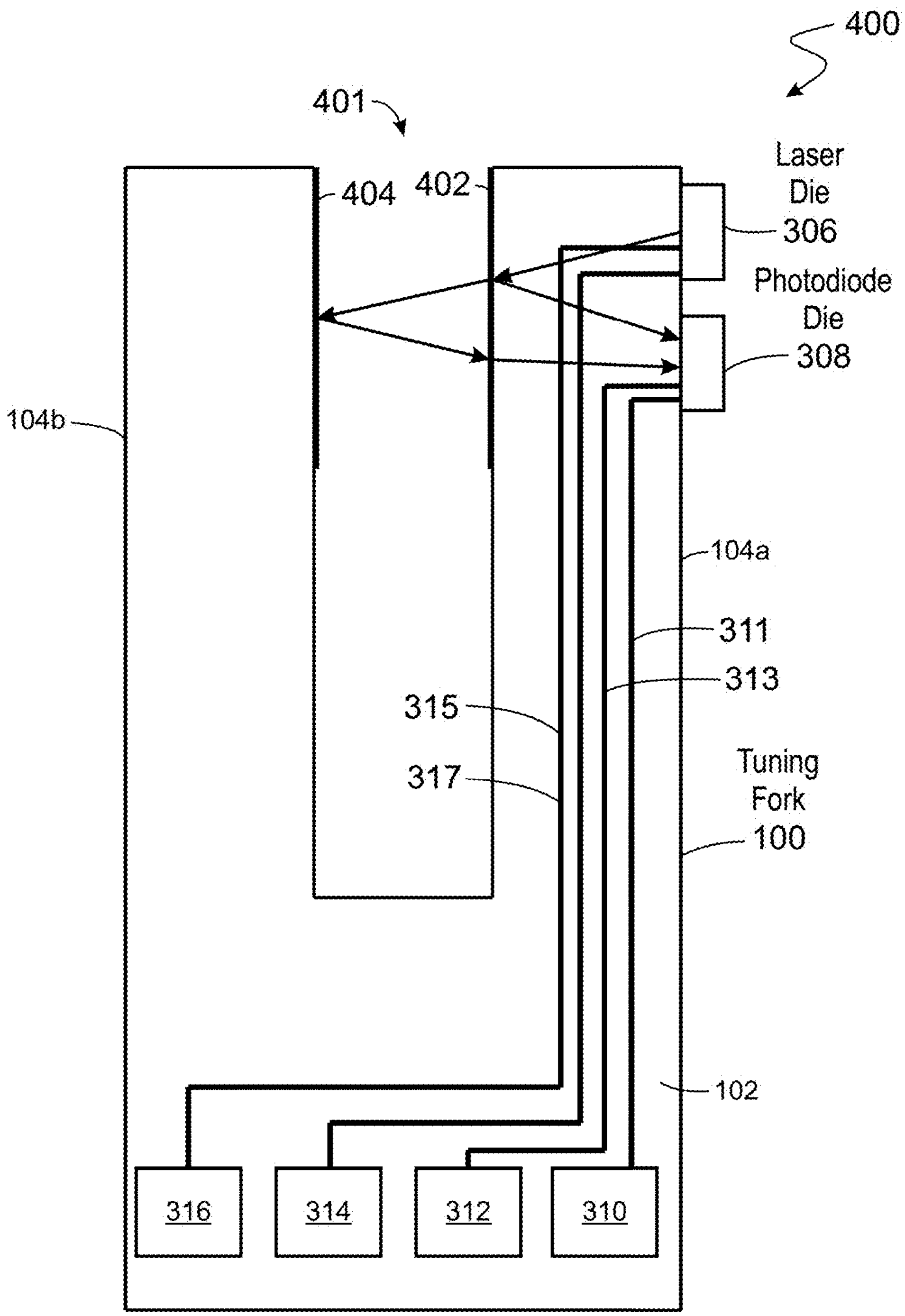
FIG. 4 is a schematic diagram of an example metamaterial thermomechanical detector with an optical cavity and optical components in a second configuration in accordance with some implementations of the present disclosure.

This disclosure also describes read-out systems and techniques that improve transduction efficiency from the mechanical to electrical domain. As mentioned before, the example device shown in FIGS. 3, and 4, where the mechanical resonator is a tuning fork made out of an optically transparent material such as quartz, sapphire, silicon dioxide, or lithium niobate. The material can also be silicon that is transparent in IR range. As mentioned already, the front side of the tuning fork is coated with a metamaterial absorber 200. The absorber is typically a MIM absorber as in the example shown in FIGS. 1A-1B. In FIGS. 3, and 4 different interferometric layouts are used for converting the mechanical energy from thermo-mechanical domain to optical domain and from optical domain to electrical domain.

For example, FIG. 3 is a schematic diagram of an example metamaterial thermomechanical detector 300 with an optical cavity and optical components in a first configuration in accordance with some implementations of the present disclosure. In FIG. 3, the optical components include a laser die 306 coupled to the first tine 104*a* and a photodetector die 308 coupled to the second tine 104*b*. The laser die 306 can include a laser, such as a diode laser, that emits a laser light at a frequency that can transmit through the optically transparent material making up the substrate 112 of the metamaterial thermomechanical detector 300. The photodetector die 308 can include a photodiode that receives optical signal and converts optical energy into electrical signal.

The laser can emit light of a frequency/wavelength that transmits through the substrate (i.e., the substrate is transparent to the selected laser light). Smaller wavelengths can provide better sensor sensitivity compared to higher wavelengths. Therefore, smaller wavelengths are preferable.

The metamaterial thermomechanical detector 300 also includes an optical cavity 301 formed from two partially reflective (or semi-transparent, or semi-reflective) surfaces: a first partially reflective surface 302 and a second partially reflective surface 304. The optical cavity 301 forms a Fabry-Pérot interferometer. In FIG. 3, the optical cavity 301 includes two semi-transparent mirrors that would allow putting the light source and the photodiode on opposite tines: the first tine 104*a* has the laser die 306 and the second tine 104*b* has the photodetector die 308. This layout facilitates easier alignment of the optical components, as compared to the FIG. 4 layout. Also, the parasitic capacitance between the electrical traces is less here. Thirdly, distributing the components to both tines help with the mechanical symmetry of the vibrating tines. Optical components can be affixed to the resonator using epoxy or solder or other known techniques.

The laser die 306 and the photodetector die 308 are attached at the tip of opposing tines 104*a* and 104*b*, respectively. A collimating microlens can be attached in front of the laser die 306 for collimating the laser beam and/or in front of the photodiode die 308 to collect more light. Alternatively, the substrate 112 material can be etched into a shape of a microlens.

The laser die 306 is coupled to a contact pad 310 by a contact trace 311, and can be coupled to a contact pad 312 by a contact trace 313. The contact pads can be used to supply power for operating the laser. The photodetector die 308 is coupled to a contact pad 314 by a contact trace 315, and can be coupled to a contact pad 316 by a contact trace 317. The photodetector can communicate generated charge to a readout circuitry using the contact pads and contact traces.

The contact pads and contact traces are formed on one side of the metamaterial thermomechanical detector 300 on a side opposite the metamaterial absorber 200. The contact pads, for example, can be formed on the base 102 of the substrate 112. The contact pads and contract traces can be formed using known fabrication techniques.

FIG. 4 is a schematic diagram of an example thermomechanical infrared detector 400 with an optical cavity 401 and optical components 306 and 308 in a second configuration in accordance with some implementations of the present disclosure. In the FIG. 4, one of the reflective surfaces (reflective surface 402) is semi-transparent/semi-reflective, while the other reflective surface 404 is fully reflective. The reflective surfaces form the optical cavity 401. In FIG. 4, the photodetector die 308 is on the same tine (tine 104*a*) as the laser die 306.

In FIG. 4, the first reflective surface 402 being semi-transparent can act as (or be designed as) a beam splitter. The second reflective surface 404 can act as (or be designed as) a mirror. The first reflective surface 402 and the second reflective surface 404 can be formed either by adhering them on the inner sides of the tines or by polishing and applying thin metal coatings to construct a Fabry-Pérot interferometer. This is true for the reflective surfaces 302 and 304 in FIG. 3.

In the case of coating, the first reflective surface 402 is a relatively thin (1-50 nm) metal coating (e.g., Gold, Aluminum, Silver, etc.) that partially transmits light. Ideally, the transmitted intensity portion is at least 50% of the incident light intensity. This relatively thin metal coating can be used in the configuration in FIG. 3 for both reflective surfaces.

The second reflective surface 404 is a relatively thick (50 nm-1 μm) metal coating (Gold, Aluminum, Silver, etc.) that acts as a mirror. The coatings can be also dielectric materials and can serve similar functions. The reflected light beams from both tines interfere on the photodiode.

Figure 10:
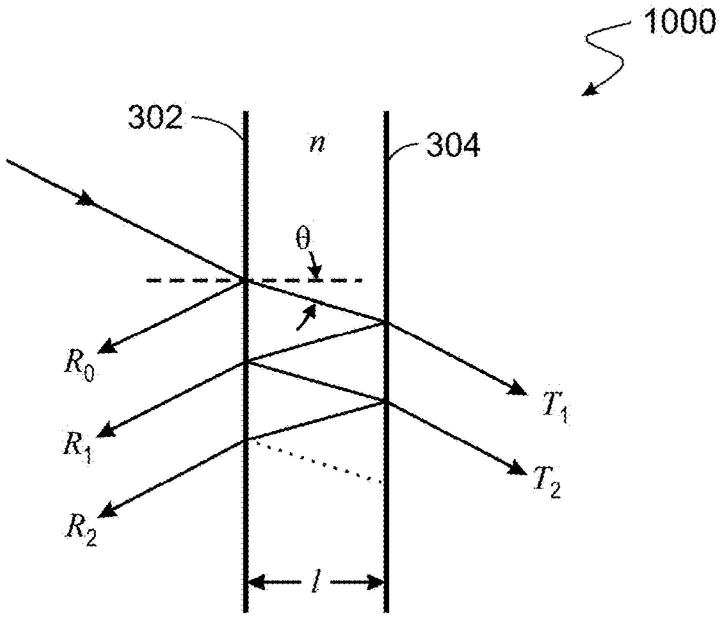
FIG. 10 is a schematic diagram illustrating an example optical cavity and reflection and transmission ray diagrams.

In operation of either Fabry-Pérot interferometer (of FIG. 3 or 4), as the tines 104*a* and 104*b* are vibrating, the laser on laser die 306 is activated. Laser light transmits through the substrate 112 and the first semi-reflecting surface 302, where the light enters the optical cavity 301. The light is partially reflected by the semi-reflecting surfaces 302 and 304 of the optical cavity; and some of the light transmits through the optical cavity 301. This phenomenon is shown in FIG. 10. Either the reflected or the transmitted light is detected by the photodetector at the photodetector die 308 depending on the configuration. As the tines 104*a* and 104*b* vibrate, the optical cavity length changes, thereby changing the intensity of the light received by the photodetector. The operation of the Fabry-Pérot interferometer is explained in more detail in the text accompanying FIGS. 10-13.

The degree of interference change depends on the motion of the tines with respect to each other. The use of interferometric readouts, as described here, can achieve a lower noise floor, and therefore can provide very sensitive mechanical measurements. The Fabry Pérot interferometer cavity forms a resonance cavity such that light bounces back and forth between the two parallel semi-reflective surfaces and light at certain wavelengths are transmitted through the semi-reflective surfaces more than some other wavelengths as shown in FIG. 10.

FIGS. 5A-E are schematic diagrams 500 illustrating an example process for forming the example thermomechanical infrared detector of FIG. 4 in accordance with some implementations of the present disclosure.

Various fabrication processes can be used to realize such devices. Below, a few examples are shown. These devices can be built on any type of substrate material, as discussed herein. To name a few, quartz, silicon, sapphire, lithium niobate, glass etc.

Figures 5A, 5B, 5C, 5D, 5E:
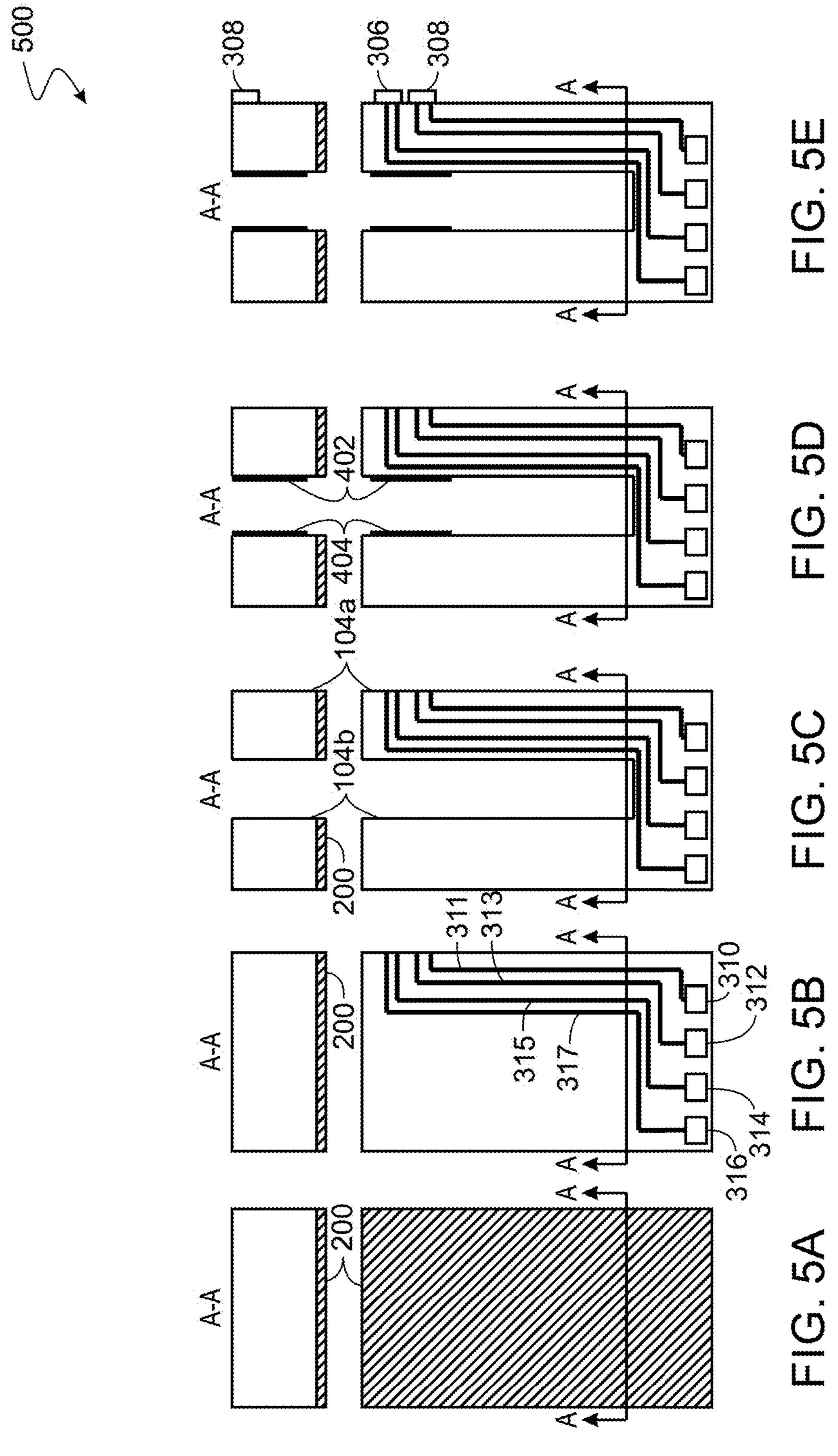
FIGS. 5A-E are schematic diagrams illustrating an example process for forming the example metamaterial thermomechanical detector of FIG. 4 in accordance with some implementations of the present disclosure.

Example process for fabricating the metamaterial thermomechanical detector 400 is shown in FIGS. 5A-E. First, as shown in FIG. 5A, the patterning of a metamaterial absorber 200 on the backside of a substrate 112 is performed. The substrate 112, shown in FIG. 1B, can be part of a larger wafer. The patterning may be done using the fabrication methods explained before where UV or electron beam lithography can be used. Alternatively, a metal nanoparticle suspension can be drop-casted on the surface.

As shown in FIG. 5B, after the metamaterial deposition, electrode pads 310-316 and contact traces 311-317 are patterned through metal deposition or other known fabrication techniques. Here, the contact pads 310-316 are formed on the base 102 (shown in FIG. 4, for example) and the contact traces 311-317 are configured for the same-side configuration of FIG. 4.

As shown in FIG. 5C, the tuning fork shape is achieved by selectively etching the gap between the tines 104*a* and 104*b*. Selective etching can include spin coating a photoresist, using photolithography to define a mask, etc., which are well-known microfabrication techniques. The through etching of the wafer can be accomplished by using wet or dry etching processes also well-known in the literature.

Once the tuning fork tines 104*a* and 104*b* are defined, the reflective surfaces 402 and 404 on the inner side walls of each of the first tine 104*a* and the second tine 104*b* can be formed by oblique angle metal deposition, as shown in FIG. 5D. Reflective surfaces 402 and 404 can be formed on the inner side-walls by metal deposition at oblique angles. Alternatively thin mirror films can be adhered to the inner walls with a manual process.

As shown in FIG. 5E, active optical components (laser die 306 and photodetector die 308) can be placed directly on the tuning fork substrate 112. As mentioned before, one or more lenses, such as a collimating lens, can also be added either by etching or adhering the lens to the substate 112. Alternatively, the optical readout setup including a laser and a photodiode can be placed on a separate holder to detect the mechanical motion of the tuning fork.

Figure 6:
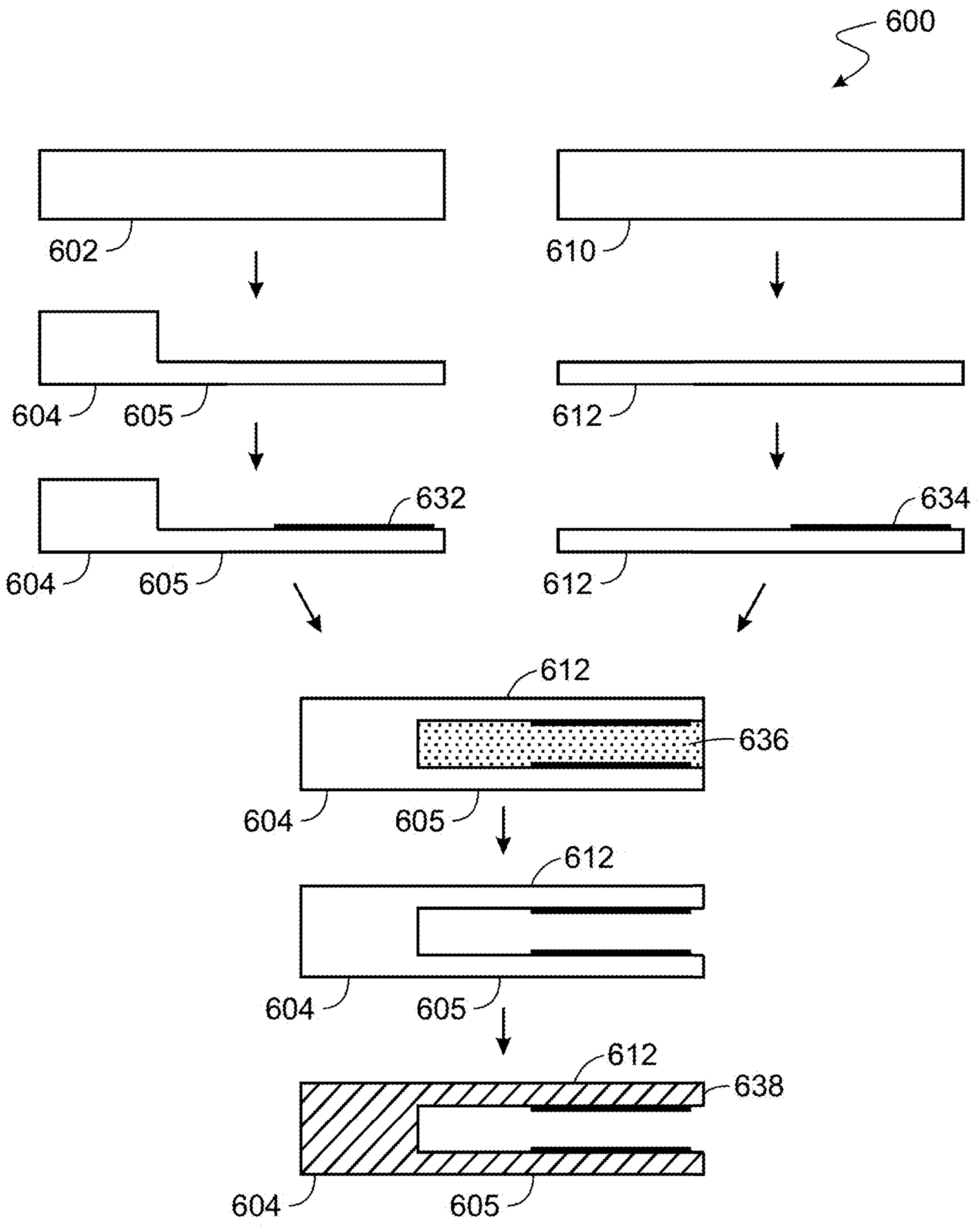
FIG. 6 is a schematic diagram illustrating an example process for forming a metamaterial thermomechanical detector by a bonding process.

The side walls of etched surfaces can be optically rough especially for interferometric applications. This may pose a challenge in terms of the feasibility of fabrication very smooth sidewalls where the mirrors can be formed. As an alternative FIG. 6 shows a fabrication process where two pieces are bonded together to form a tuning fork and mirrors can be formed on the top polished surfaces of the substrates. FIG. 6 is a schematic diagram 600 illustrating an example process for forming a thermomechanical infrared detector by a bonding process.

A first wafer 602 is etched partially to form a stem 604 and a first tine 605 of a tuning fork. A second wafer 610 is etched to form a second tine 612 of a tuning fork. If necessary mechanical or chemical polishing can be applied to the etched top surfaces to make them optically smooth such that the surface roughness is several times less than the operation wavelength (e.g., a few nanometers).

Then, reflective surfaces are formed by metallization of a portion of the tine surfaces. For example, a first reflective surface 632 is formed on the first tine 605, and a second reflective surface 634 can be formed on the second tine 612.

The reflective surfaces can have the desired optical properties depending on the configuration (i.e., fully reflective, semi-reflective, etc.). Oblique metal deposition angles are not needed in this method as the mirrors are formed on the top surfaces of the substrates.

Then the second tine 612 is bonded to the stem 604. Several alternative fabrication steps can be followed depending on the need. Large strains during bonding may cause breaking of the tines. If so, a support material 636 can be coated on the first tine 605. The support material 636 can be etched away after the bonding to release the tines of the tuning fork. Release can be also done if individual forks need to be diced from the bonded wafer. An alternative order would be to dice the individual tines from the wafers before bonding and using flip-chip bonding to create the forks one by one.

Then, the sidewalls of each fork can be decorated with a metamaterial absorber 638. Similar to the previously shown process, the process in FIG. 6 may also include electrodes for the integrated laser and photodiode. Electrodes can be patterned before the first etching steps on the back side of the wafers (opposite sides of the reflective surfaces).

Figure 7:
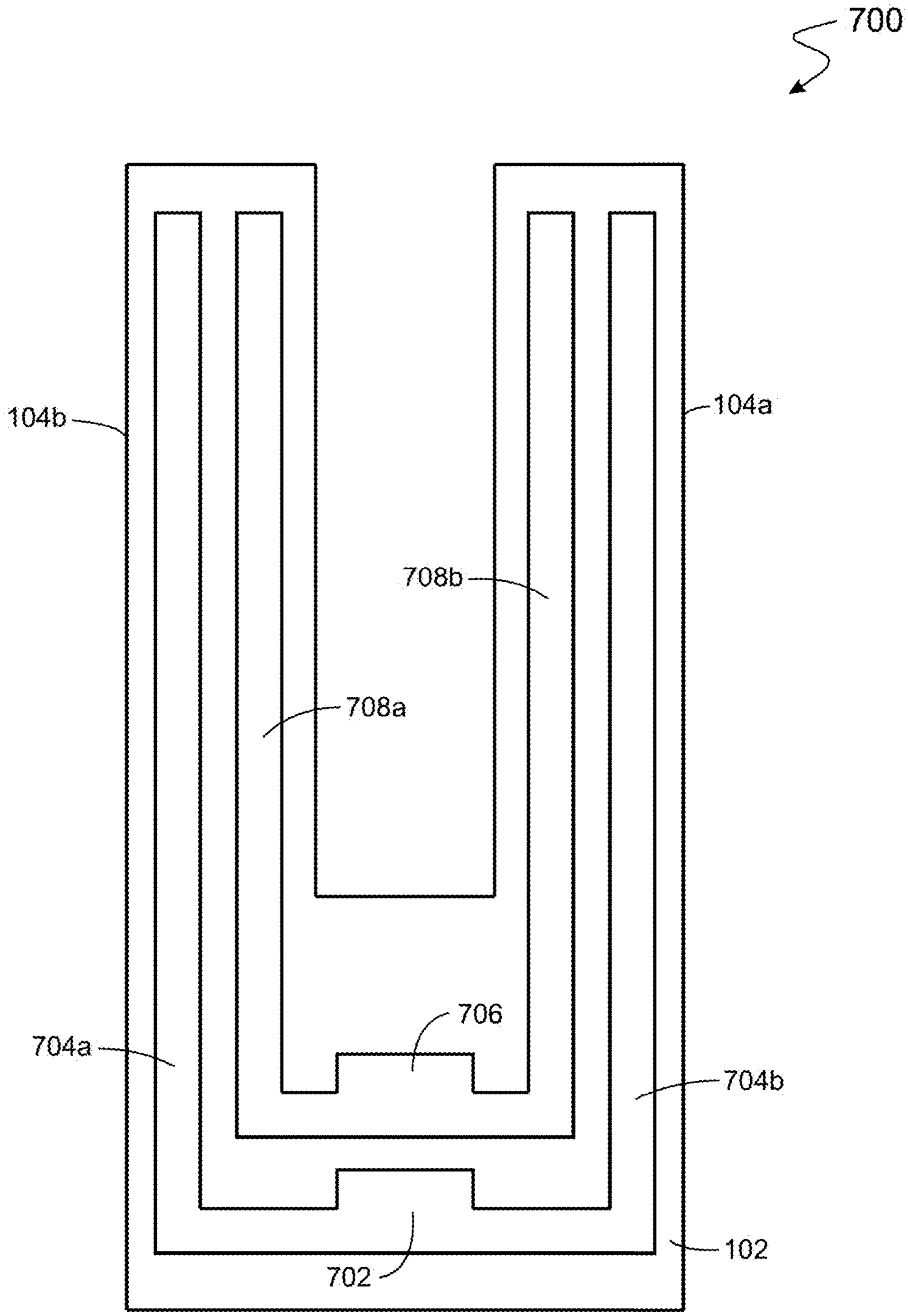
FIG. 7 is a schematic diagram of a metamaterial thermomechanical detector that includes electrodes for carrying charge generated from a piezoelectric effect in accordance with some implementations of the present disclosure.

FIG. 7 is a schematic diagram of a metamaterial thermomechanical detector 700 that includes electrodes for carrying charge generated from a piezoelectric effect in accordance with some implementations of the present disclosure. In the example configuration shown in FIG. 7, the metamaterial thermomechanical detector 700 can be made of lithium niobate or other piezoelectric crystalline material, such as quartz. A first contact pad 702 can be formed that facilitates electrical communication of current through the electrodes 704*a* and 704*b* with the signal processor. A second contact pad 706 can be formed that facilitates electrical communication of current through the electrodes 708*a* and 708*b* with the electrical readout circuitry. The two sets of electrodes establish a circuit between the positive and negative dipoles formed through the piezoelectric effect.

The mechanical to electrical transduction of the metamaterial thermomechanical detector 700 relies on the piezoelectric effect. When the tines 104*a* and 104*b* deform, the resulting dipole moment creates a voltage difference across the electrodes, causing a current.

In both electrical (piezoelectric) and optical (Fabry-Pérot) detection schemes, the signals are measured with respect to known concentrations of gas. For example the measured signal amplitude can be noted for 5 different concentrations for the targeted range of concentrations. This provides a calibration curve, or function, for the transfer function of the whole system. Any response between the calibration concentration can be interpolated based on this calibration curve. Thus, the calibration curve, or function, is used to convert electrical or optical signals to real concentration values during measurements.

Figure 8:
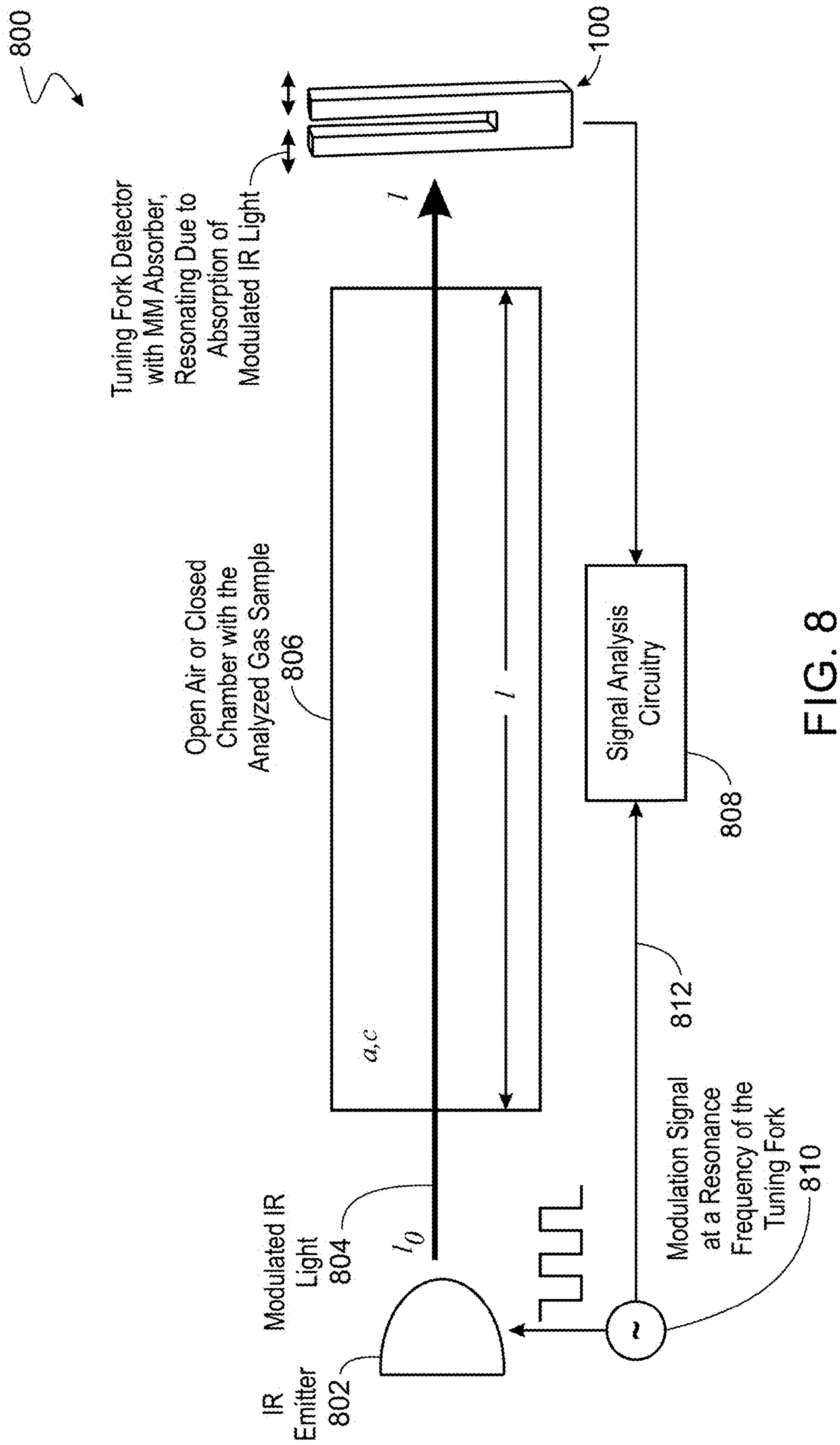
FIG. 8 is a schematic diagram of a gas detection system that includes a metamaterial thermomechanical detector, and infrared detector, and a signal analysis component in accordance with some implementations of the present disclosure.

FIG. 8 is a schematic diagram of a gas detection system 800 that includes a metamaterial thermomechanical detector 100, an infrared emitter 802, and a signal analysis component 808 in accordance with some implementations of the present disclosure. A simplified sensing scheme using this detector is shown in FIG. 8. The system includes a testing chamber 806 that includes a gas under test. The light emitter 802 can emit infrared (IR) light at one or more desired frequencies (or wavelengths). The light emitter 802 can emit light based on a modulation signal provided by a modulation signal generator circuit 810. The modulated IR light 804 is directed through the testing chamber 806, where the modulated IR light interacts with the gas in the testing chamber 806. The IR light that is transmitted through the testing chamber 806 is absorbed onto the metamaterial thermomechanical absorber 100.

The light beam going through the gas medium in the testing chamber 806 is attenuated depending on the concentration of gas, path length of the light within the gas, and the gas's absorption strength at the selected IR wavelength following the Beer-Lambert's law expressed with the equation (Eq1):

$$I(\lambda) = I_0(\lambda)e^{-\alpha(\lambda)cl} \quad \text{(Eq 1)}$$

where I is the measured intensity of the light after absorption, $I_0$ is the emitted light intensity, $\alpha$ and c are the absorption coefficient and concentration of the gas, l is the interaction length of the light beam with the gas, and $\lambda$ is the wavelength. This means, for the simplified setup shown in FIG. 8, as $\alpha$, c, or l increases at a selected $\lambda$, a decrease in the intensity of light arriving at the detector results in the detector resonating at a smaller amplitude and generates a smaller voltage output. Typically, $\alpha$ and l are constant, therefore detected changes in the signal amplitude are understood as changes in the target gas concentration. The emitted light intensity is prone to change over time (due to temperature, input voltage fluctuations, aging of the emitter etc.). Therefore, a reference measurement is needed. Namely, both I and $I_0$ should be measured to eliminate these output intensity changes. The reference measurement can be made by splitting a known portion of the light beam 812 and measuring it using a secondary detector as illustrated in FIG. 8. Then, equation (Eq2) can be used to track changes in the gas concentration.

$$c = -\ln\left(\frac{I(\lambda)}{I_0(\lambda)}\right)/\alpha(\lambda)l \quad \text{(Eq 2)}$$

The metamaterial can be engineered to have a broadband absorption or narrow band absorption depending on the sensing application. In spectroscopic sensing, the IR source wavelength can be scanned over a range of values and most of the light in this range of wavelengths is absorbed by the broadband metamaterial. A narrowband absorber can be used to target single gas detection. In this second case, especially if the source has a relatively broader wavelength content, the absorber can act also as an optical filter. This eliminates the detection of light that interacts with gasses other than the target gas. Therefore, it increases the selectivity of the measurement.

The IR light emitter 802 can be a blackbody radiation source, laser, or light emitting diode (LED). Blackbody radiation sources are broadband sources that are low cost and easy to produce. For example, incandescent lamps are an example of this type of source. LEDs can have much narrower bandwidth but may still require an optical filter to increase the selectivity. Lasers typically provide the narrowest bandwidth and can remove the need for an optical filter. An alternative way to create narrow bandwidth emitters also employ the metamaterial perfect absorbers. A narrowband perfect absorber can be heated to emit light predominantly at its peak absorption wavelength. Therefore, the same metamaterial absorber design that is used on the detector can be employed to make an emitter.

Figure 9:
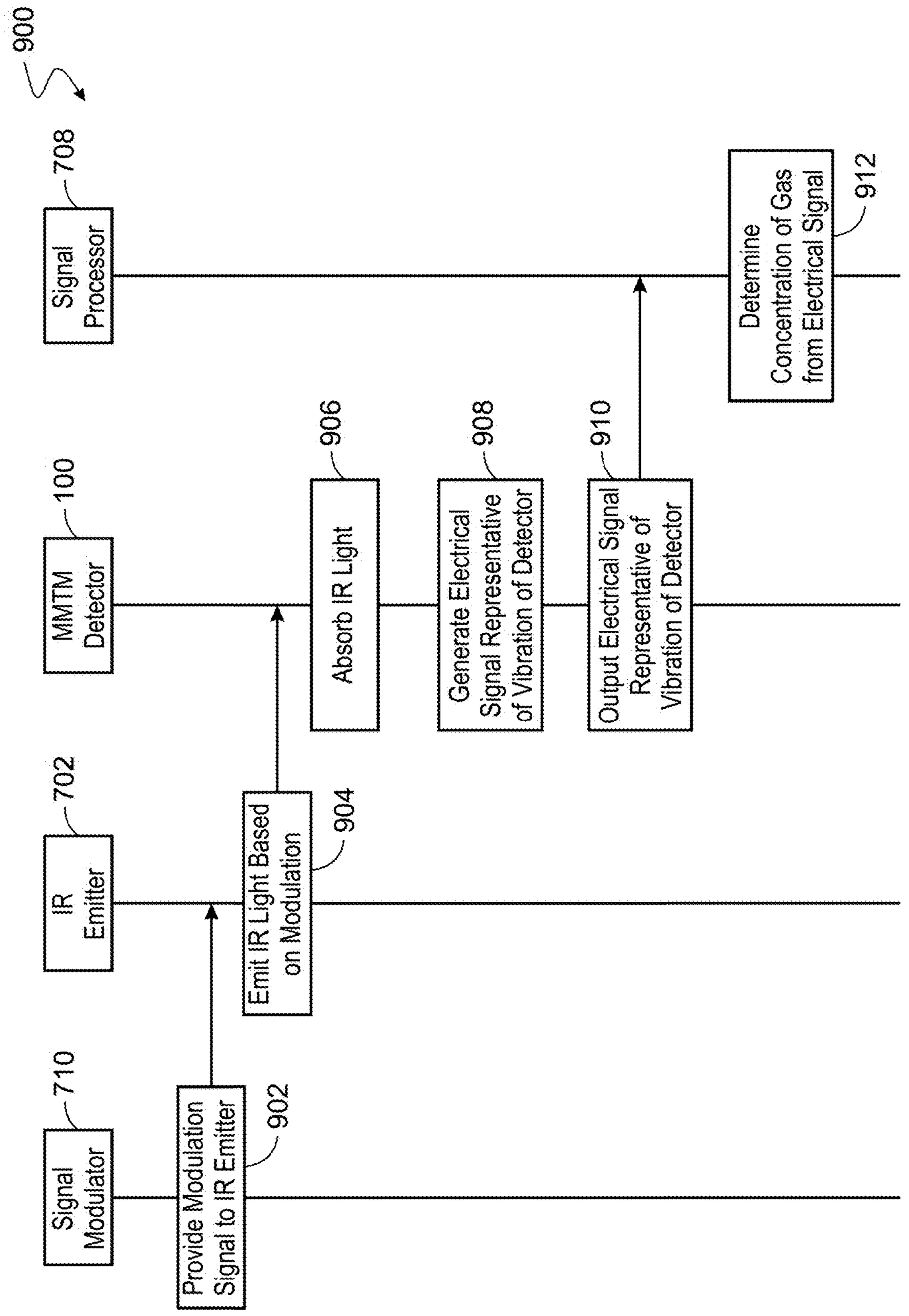
FIG. 9 is a process flow diagram for detecting a concentration of an analyte molecule using a metamaterial thermomechanical detector that includes a metamaterial absorber in accordance with some implementations of the present disclosure.

FIG. 9 is a process flow diagram for detecting a concentration of an analyte molecule using a thermomechanical infrared detector that includes a metamaterial absorber in accordance with some implementations of the present disclosure. FIG. 9 is a flowchart of an example of a method 900 for detecting a concentration of an analyte using a metamaterial thermomechanical detector (MMTM in FIG. 9) according to implementations of the present disclosure. For clarity of presentation, the description that follows generally describes method 900 in the context of the other figures in this description. However, it will be understood that method 900 can be performed, for example, by any suitable system, environment, software, and hardware, or a combination of systems, environments, software, and hardware, as appropriate. In some implementations, various steps of method 900 can be run in parallel, in combination, in loops, or in any order.

At 902, a modulation signal from a signal modulator is provided to the IR light emitter 702. The modulation signal can be determined based on a resonant frequency of the metamaterial thermomechanical detector. That is, the IR light is emitted at an emission frequency that is the same or nearly the same as the resonant frequency of the metamaterial thermomechanical detector. This modulation frequency should not be confused with the electromagnetic frequency of the IR light itself, which can be selected based on the analyte or analytes under examination. The IR frequency can be scanned over a narrow or broad range, for example. For broad spectrum IR emitters, the metamaterial absorber can act as a filter for specific IR frequency bandwidths.

From 902, method 900 proceeds to 904.

At 904, the IR light emitter emits IR light towards the metamaterial thermomechanical detector. The IR light first enters into a testing chamber that includes one or more analytes in gaseous form. For example, the testing chamber can include CO2, H2, or other gases. The analyte molecules absorb the IR light at specific frequencies, which reduces the intensity of the IR light at those frequencies that reaches and is absorbed by the metamaterial thermomechanical detector.

From 904, method 900 proceeds to 906.

At 906, the remaining IR light (that is not absorbed by the analyte molecules) is absorbed by the metamaterial thermomechanical detector. The absorption of the IR light causes a thermal change in the metamaterial thermomechanical detector. The modulation of the IR light causes the thermal change to oscillate, thereby causing the metamaterial thermomechanical oscillator to vibrate. Such vibration can be at or near the resonant frequency of the metamaterial thermomechanical detector.

From 906, method 900 proceeds to 908.

At 908, an electrical charge is generated based on the vibration of the metamaterial thermomechanical detector. The electrical signal can be generated in different ways. For example, an optical configuration can be used to generate a signal through a photodetector. A laser can emit light into an optical cavity formed between tines of the metamaterial thermomechanical detector, such that used by a Fabry-Pérot interferometer. The vibration of the metamaterial thermomechanical detector creates an interferometric light modulation that is detected by the photodetector. The resulting electrical charge can be detected by a signal processor 708 that can resolve the interferometric signal as an electrical signal. The interferometric signal can indicate the amplitude and frequency of the vibration. The amplitude of the vibration can be correlated with the intensity of the IR light absorbed by the metamaterial thermomechanical detector. And the intensity of the IR light absorbed can be compared against the intensity of the IR light emitted to determine the absorption spectrum of the gas under test. The absorption spectrum can then be correlated with a concentration of the gases in the testing chamber, to the extent the gases absorb IR light in the frequency range(s) used.

The detection frequency is expected to be at the modulation frequency. In embodiments, a lock-in amplifier is used (as part of the signal processing) to filter the signal exactly at this modulation frequency to further lower the noise floor and improve the sensitivity.

In another embodiment, the vibration of the tines of the metamaterial thermomechanical detector result in the creation of charge by the piezoelectric effect. The charge can be carried to the signal processor by way of electrodes. The larger the deformation of the tines, is the more charge created. Thus, the charge can be used to determine the deformation, which correlates back to the intensity of the IR light absorbed.

From 908, method 900 proceeds to 910.

At 910, electrical charge is output the to signal processor 708. The charge is carried by electrodes that are formed or placed on the metamaterial thermomechanical detector.

From 910, method 900 proceeds to 912.

Figure 11:
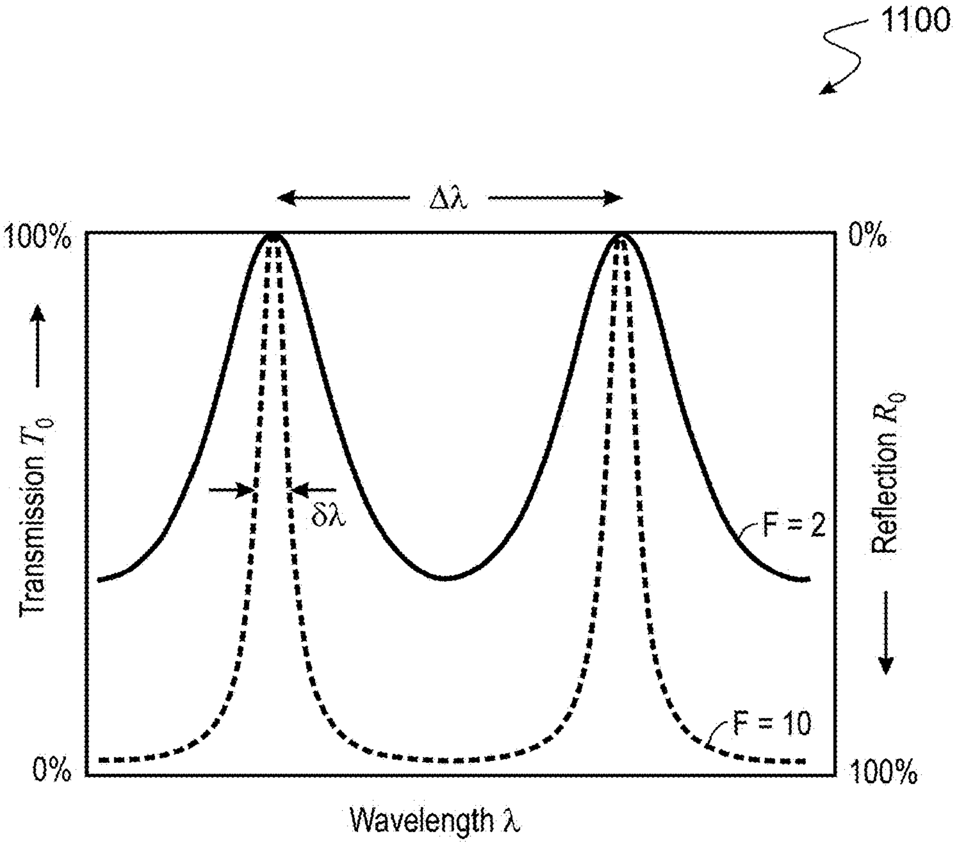
FIG. 11 is a graphical illustration of a transmission of Fabry-Pérot interferometer as a function of wavelength.

At 912, the signal processor can use the electrical signals to determine the concentration of analyte gas. For example, as shown in FIGS. 10-13, the Fabry Perot cavity forms a resonance cavity such that light bounce back and forth between the two parallel semi-reflective surfaces (shown in FIG. 10). Light at certain wavelengths are transmitted through the semi-reflective surfaces more than some other wavelengths as shown in FIGS. 10 and 11. FIG. 10 is a schematic diagram 1000 illustrating an example ray diagram of light reflected and transmitted in an optical cavity and reflection and transmission ray diagrams. FIG. 11 is a graphical illustration 1100 of a transmission and reflection of IR light in a Fabry-Pérot interferometer as a function of wavelength.

Transmission, T, of the light through the Fabry-Perot resonator is given by the formula of Eq3:

$$T = \frac{(1-r)^2}{1-2r\cos\delta + r^2} = \frac{1}{1+F\sin^2\left(\frac{\delta}{2}\right)} \quad \text{(Eq 3)}$$

where r is the reflectance of each mirror, and F is defined as finesse and given by the following formula Eq4:

$$F = \frac{4r}{(1-r)^2} \quad \text{(Eq 4)}$$

δ is defined by the formula Eq5:

$$\delta = \left(\frac{2\pi}{\lambda}\right) 2nl\cos\theta \quad \text{(Eq 5)}$$

where λ is the light wavelength, n is the refractive index of the medium, l is the length between the two mirrors, and θ is the angle of incidence (see SF-5). Reflected signal intensity can be calculated as equation Eq6:

$$R = 1 - T \quad \text{(Eq 6)}$$

Figure 12:
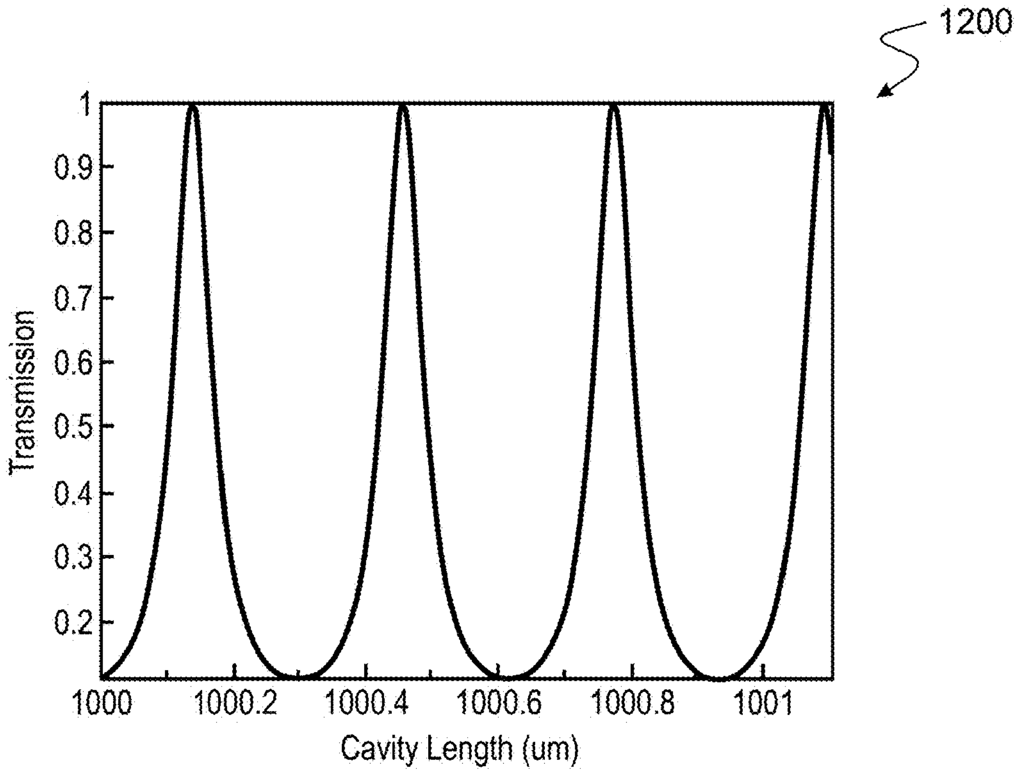
FIG. 12 is a graphical illustration of a change in Fabry-Pérot cavity transmission as a function of cavity length.
Figure 13:
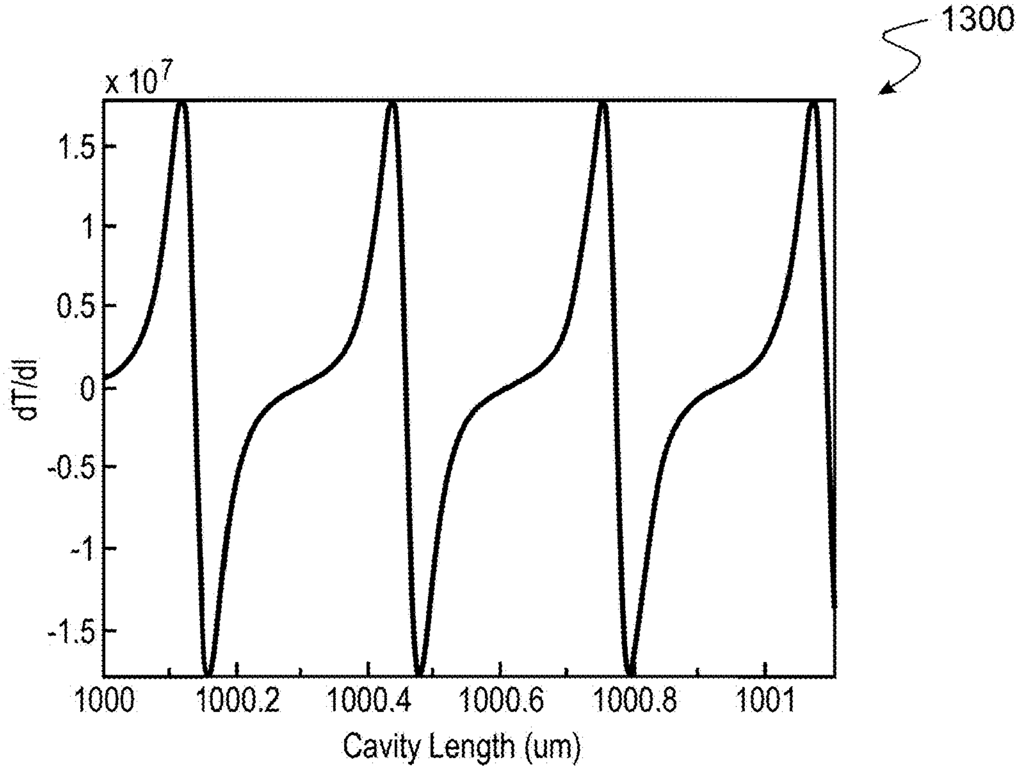
FIG. 13 is a graphical illustration of a derivative of transmission function with respect to cavity length.

The vibration of the tines changes the cavity length. As the cavity length, l, changes the intensity of the light transmitted or reflected would change according to the Eq3 and Eq6. For example, a tuning fork with mirrors reflectivity r=0.5 would transmit light with 633 nanometers as shown in FIG. 12 as a function of length between the mirrors. FIG. 12 is a graphical illustration 1200 of a change in Fabry-Pérot cavity transmission as a function of cavity length. As shown in FIG. 12, the transmission of the Fabry Perot cavity changes when the length between the tines changes. Therefore, by detecting the change in light intensity that is transmitted or reflected, the signal processor can determine how much the tines move very precisely. The initial cavity length and the laser wavelength can be selected such that the transmission at the idle state corresponds to a highest slope on the transmission curve to maximize the measurement sensitivity. For the example case shown in FIG. 12, where the wavelength is fixed to 633 nm, the highest slope can be found using the first derivative of the transmission function with respect to cavity length as shown in FIG. 13. FIG. 13 is a graphical illustration 1300 of a derivative of transmission function with respect to cavity length. In FIG. 13, maxima and minima points would be the best cavity lengths for the highest sensitivity.

In both piezoelectrical and optical (Fabry-Perot) detection schemes, the signals are measured with respect to known concentrations of gas. That is, the metamaterial thermomechanical detector can be operated under calibration conditions for each desired analyte. For example, the measured signal amplitude can be noted for 5 different concentrations for the targeted range of concentrations for each analyte. This provides a calibration curve, or function, for the transfer function of the whole system. Any response is between the calibration concentration can be interpolated based on this calibration curve. Thus, the calibration curve, or function, is used to convert electrical or optical signals to real concentration values during measurements. FIG. 14 is a graphical representation of absorption spectra 1400 for various analyte molecules from emission in the mid-infrared range.

After 912, method 900 can stop.

Figure 15:
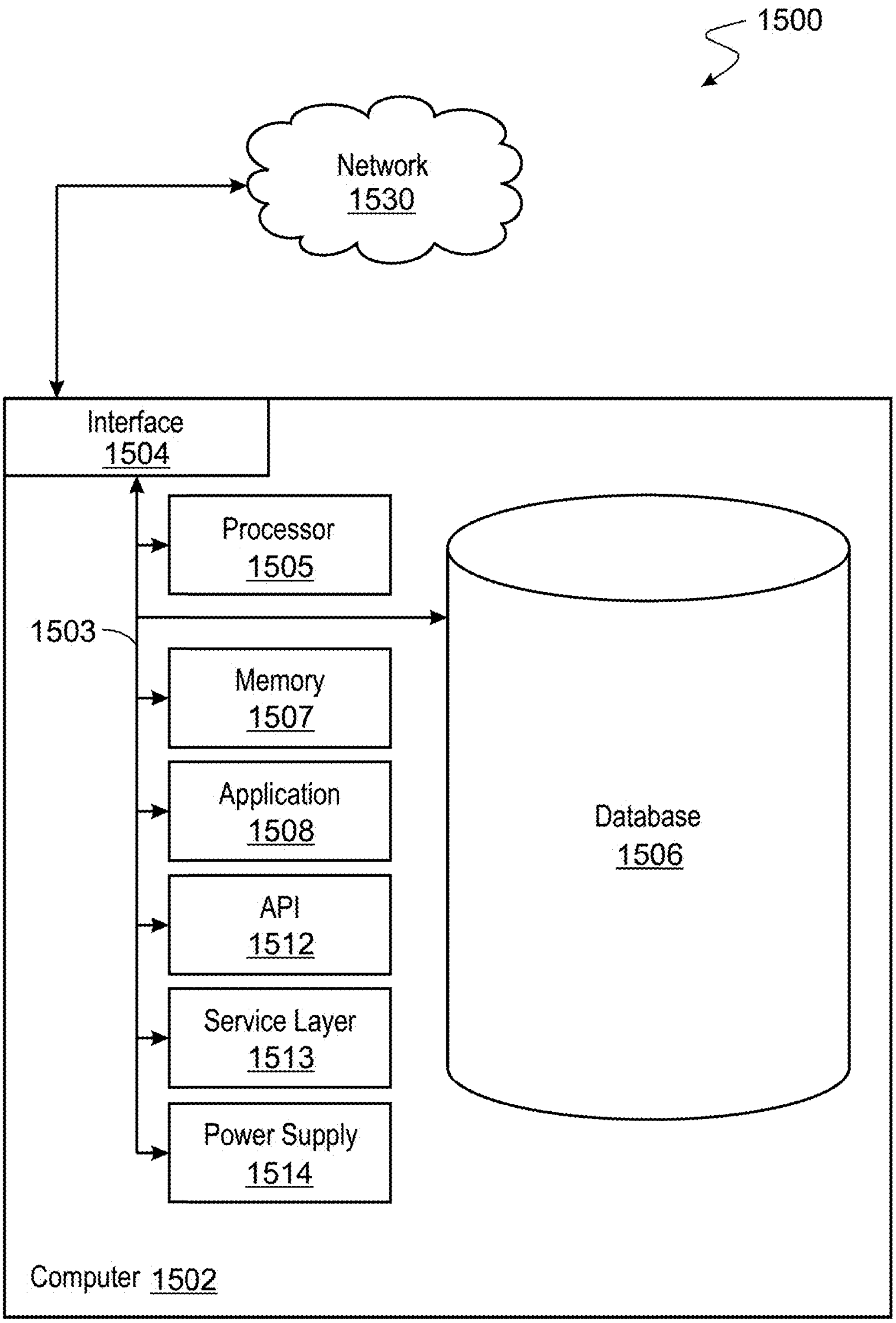
FIG. 15 is a block diagram illustrating an example computer system used to provide computational functionalities associated with described algorithms, methods, functions, processes, flows, and procedures as described in the present disclosure, according to some implementations of the present disclosure.

FIG. 15 is a block diagram of an example computer system 1500 used to provide computational functionalities associated with described algorithms, methods, functions, processes, flows, and procedures described in the present disclosure, according to some implementations of the present disclosure. The illustrated computer 1502 can be used to implement various control schemes described herein, including providing a modulation signal to the IR emitter 702 and performing signal processing of received electrical charge/signals representative of vibration intensity of the metamaterial thermomechanical detector. The illustrated computer 1502 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 1502 can include input devices such as keypads, keyboards, and touch screens that can accept user information. Also, the computer 1502 can include output devices that can convey information associated with the operation of the computer 1502. The information can include digital data, visual data, audio information, or a combination of information. The information can be presented in a graphical user interface (UI) (or GUI).

The computer 1502 can serve in a role as a client, a network component, a server, a database, a persistency, or components of a computer system for performing the subject matter described in the present disclosure. The illustrated computer 1502 is communicably coupled with a network 1530. In some implementations, one or more components of the computer 1502 can be configured to operate within different environments, including cloud-computing-based environments, local environments, global environments, and combinations of environments.

At a top level, the computer 1502 is an electronic computing device operable to receive, transmit, process, store, and manage data and information associated with the described subject matter. According to some implementations, the computer 1502 can also include, or be communicably coupled with, an application server, an email server, a web server, a caching server, a streaming data server, or a combination of servers.

The computer 1502 can receive requests over network 1530 from a client application (for example, executing on another computer 1502). The computer 1502 can respond to the received requests by processing the received requests using software applications. Requests can also be sent to the computer 1502 from internal users (for example, from a command console), external (or third) parties, automated applications, entities, individuals, systems, and computers.

Each of the components of the computer 1502 can communicate using a system bus 1503. In some implementations, any or all of the components of the computer 1502, including hardware or software components, can interface with each other or the interface 1504 (or a combination of both) over the system bus 1503. Interfaces can use an application programming interface (API) 1512, a service layer 1513, or a combination of the API 1512 and service layer 1513. The API 1512 can include specifications for routines, data structures, and object classes. The API 1512 can be either computer-language independent or dependent. The API 1512 can refer to a complete interface, a single function, or a set of APIs.

The service layer 1513 can provide software services to the computer 1502 and other components (whether illustrated or not) that are communicably coupled to the computer 1502. The functionality of the computer 1502 can be accessible for all service consumers using this service layer. Software services, such as those provided by the service layer 1513, can provide reusable, defined functionalities through a defined interface. For example, the interface can be software written in JAVA, C++, or a language providing data in extensible markup language (XML) format. While illustrated as an integrated component of the computer 1502, in alternative implementations, the API 1512 or the service layer 1513 can be stand-alone components in relation to other components of the computer 1502 and other components communicably coupled to the computer 1502. Moreover, any or all parts of the API 1512 or the service layer 1513 can be implemented as child or sub-modules of another software module, enterprise application, or hardware module without departing from the scope of the present disclosure.

The computer 1502 includes an interface 1504. Although illustrated as a single interface 1504 in FIG. 15, two or more interfaces 1504 can be used according to particular needs, desires, or particular implementations of the computer 1502 and the described functionality. The interface 1504 can be used by the computer 1502 for communicating with other systems that are connected to the network 1530 (whether illustrated or not) in a distributed environment. Generally, the interface 1504 can include, or be implemented using, logic encoded in software or hardware (or a combination of software and hardware) operable to communicate with the network 1530. More specifically, the interface 1504 can include software supporting one or more communication protocols associated with communications. As such, the network 1530 or the interface's hardware can be operable to communicate physical signals within and outside of the illustrated computer 1502.

The computer 1502 includes a processor 1505. Although illustrated as a single processor 1505 in FIG. 15, two or more processors 1505 can be used according to particular needs, desires, or particular implementations of the computer 1502 and the described functionality. Generally, the processor 1505 can execute instructions and can manipulate data to perform the operations of the computer 1502, including operations using algorithms, methods, functions, processes, flows, and procedures as described in the present disclosure.

The computer 1502 also includes a database 1506 that can hold data for the computer 1502 and other components connected to the network 1530 (whether illustrated or not). For example, database 1506 can be an in-memory, conventional, or a database storing data consistent with the present disclosure. In some implementations, database 1506 can be a combination of two or more different database types (for example, hybrid in-memory and conventional databases) according to particular needs, desires, or particular implementations of the computer 1502 and the described functionality. Although illustrated as a single database 1506 in FIG. 15, two or more databases (of the same, different, or combination of types) can be used according to particular needs, desires, or particular implementations of the computer 1502 and the described functionality. While database 1506 is illustrated as an internal component of the computer 1502, in alternative implementations, database 1506 can be external to the computer 1502.

The computer 1502 also includes a memory 1507 that can hold data for the computer 1502 or a combination of components connected to the network 1530 (whether illustrated or not). Memory 1507 can store any data consistent with the present disclosure. In some implementations, memory 1507 can be a combination of two or more different types of memory (for example, a combination of semiconductor and magnetic storage) according to particular needs, desires, or particular implementations of the computer 1502 and the described functionality. Although illustrated as a single memory 1507 in FIG. 15, two or more memories 1507 (of the same, different, or combination of types) can be used according to particular needs, desires, or particular implementations of the computer 1502 and the described functionality. While memory 1507 is illustrated as an internal component of the computer 1502, in alternative implementations, memory 1507 can be external to the computer 1502.

The application 1508 can be an algorithmic software engine providing functionality according to particular needs, desires, or particular implementations of the computer 1502 and the described functionality. For example, application 1508 can serve as one or more components, modules, or applications. Further, although illustrated as a single application 1508, the application 1508 can be implemented as multiple applications 1508 on the computer 1502. In addition, although illustrated as internal to the computer 1502, in alternative implementations, the application 1508 can be external to the computer 1502.

The computer 1502 can also include a power supply 1515. The power supply 1515 can include a rechargeable or non-rechargeable battery that can be configured to be either user- or non-user-replaceable. In some implementations, the power supply 1515 can include power-conversion and management circuits, including recharging, standby, and power management functionalities. In some implementations, the power-supply 1515 can include a power plug to allow the computer 1502 to be plugged into a wall socket or a power source to, for example, power the computer 1502 or recharge a rechargeable battery.

There can be any number of computers 1502 associated with, or external to, a computer system containing computer 1502, with each computer 1502 communicating over network 1530. Further, the terms "client," "user," and other appropriate terminology can be used interchangeably, as appropriate, without departing from the scope of the present disclosure. Moreover, the present disclosure contemplates that many users can use one computer 1502 and one user can use multiple computers 1502.

Described implementations of the subject matter can include one or more features, alone or in combination.

For example, in a first implementation, a computer-implemented method includes the following.

Example 1 is an infrared detector that includes a tuning fork resonator including an mechanical-to-electrical transduction mechanism; a metamaterial absorber residing on at least one side of the tuning fork resonator, the metamaterial absorber including at least a material layer with subwavelength inclusions; and a signal processing circuit to translate the electrical signal into an amplitude of mechanical motion of the tuning fork.

Example 2 may include the subject matter of example 1, wherein the mechanical-to-electrical transduction mechanism includes a piezoelectric substrate; electric contact pads; and electrodes configured to conduct charge from movement of the piezoelectric substrate to the electric contact pads.

Example 3 may include the subject matter of example 1, wherein the mechanical-to-electrical transduction mechanism includes an optically transparent material; a laser; a photodetector; and wherein the tuning fork includes a tine that includes a partially reflecting mirror.

Example 4 may include the subject matter of any of examples 1-3, wherein metamaterial absorber includes a metal resonator antenna layer including at least one feature smaller than a wavelength of emitted or absorbed light, the features including but not limited to rings, disks, spheres, polyhedron, or other features of the metal resonator antenna layer, a dielectric layer under the metal resonator antenna layer; and a metal ground plane layer under the dielectric layer. The features of the metal resonator antenna layer can be classified as having subwavelength feature sizes.

Example 5 may include the subject matter of example 4, wherein the resonator antenna layer is characterized by a broad absorption spectrum.

Example 6 may include the subject matter of example 4, wherein the resonator antenna layer is characterized by a narrow absorption spectrum.

Example 7 may include the subject matter of any of examples 1-6, wherein metamaterial absorber includes a metal layer included of subwavelength nanoparticles.

Example 8 may include the subject matter of any of examples 1-6, wherein the metamaterial layer includes a plurality of islands, each metal island including a size and/or a geometry based on a desired absorption spectrum linewidth and/or strength. As an example, the size can be subwavelength.

Example 9 may include the subject matter of example 8, wherein the plurality of islands includes dielectric islands.

Example 10 may include the subject matter of example 8, wherein the plurality of islands includes semiconductor islands.

Example 11 may include the subject matter of any of examples 1-10, and can also include a first tine extending from a base; and a second tine extending from the base opposite the first tine; wherein the first and second tines being configured to deform based on a mechanical stress imposed on the tuning fork body through absorbed infrared light.

Example 12 may include the subject matter of example 11, and can include an optical cavity, the optical cavity including a first optical element on an inner surface of the first tine; and a second optical element on an inner surface of the second tine, the first optical element opposite the second optical element.

Example 13 may include the subject matter of example 12, wherein the first optical element includes a partially reflecting thin metal coating; and the second optical element includes a partially reflecting thin metal coating. The infrared detector further including a laser coupled to an outer surface of the first tine at a location opposite the first optical element; and a photodetector coupled to an outer surface of the second tine at a location opposite the second optical element, the photodetector coupled to an output electrode for communicating a signal from the photodetector, wherein the laser is configured to emit light through the first optical element and the second optical element and onto the photodetector.

Example 14 may include the subject matter of example 12, wherein the first optical element includes a partially reflecting thin metal coating; and the second optical element includes a reflecting thin metal coating. The infrared detector also including a laser coupled to an outer surface of the first tine at a location opposite the first optical element, the laser is configured to emit light through the first optical element; and a photodetector coupled to the outer surface of the first tine at a location opposite the first optical element, the photodetector coupled to an output electrode for communicating a signal from the photodetector, and the photodetector is configured to receive light reflected from the first optical element and light reflected from the second optical element.

Example 15 may include the subject matter of any of examples 11-14, and can also include a first electrode on the first tine extending from the base; and a second electrode on the second tine extending from the base; wherein the first electrode and the second electrode carry a charge based on the deformation of the first tine and the second tine.

Example 16 is a method that includes receiving, from a testing chamber containing an analyte, modulated infrared light at a metamaterial absorber layer of a tuning fork resonator, the modulated infrared light causing the tuning for resonator to vibrate at a frequency based in part on a modulation frequency of the infrared light and with an intensity corresponding to a concentration of the analyte present in the testing chamber; receiving an electrical signal representative of the intensity of the vibration of the tuning fork resonator; determining the concentration of the analyte based on a comparison of the received electrical signal and a reference signal.

Example 17 may include the subject matter of example 16, wherein the electrical signal representative of the amplitude of the vibration of the tuning fork resonator includes an electrical signal generated from a piezoelectric effect, the piezoelectric effect causing charge to flow through an electrode based on a deformation of a tine during vibration of the tuning fork resonator.

Example 18 may include the subject matter of any of examples 16-17, wherein the electrical signal representative of the amplitude of the vibration of the tuning fork resonator includes an electrical signal generated from a photodetector receiving light reflected from an optical cavity formed on two tines of the tuning fork resonator.

Example 19 may include the subject matter of example 18, wherein the concentration of the analyte is based in part on an interference pattern detected by the photodetector.

Example 20 may include the subject matter of example 19, and can also include actuating a laser coupled to a tine of the tuning fork resonator; detecting, by the photodetector, the light originating from the laser and output from the optical cavity; and determining an amplitude of the vibration of the tuning fork resonator based on the interference pattern detected from the detected light originating from the laser, wherein the intensity of the vibration of the tuning fork corresponds to an intensity of infrared light absorbed by the metamaterial absorber; and determining a concentration of analyte from the intensity of the vibration of the tuning fork.

Example 21 is a system that includes a metamaterial thermomechanical detector including a metamaterial absorber residing on at least one side of the metamaterial thermomechanical detector; a infrared light emitter; an analyte test chamber configured to contain an analyte; and an infrared light emitter controller configured to provide a modulation signal for modulating emission of infrared light from the infrared light emitter; and a signal analysis processor including hardware and software and configured to receive an electrical signal from the metamaterial thermomechanical detector, the electrical signal representative of a vibrational intensity of the metamaterial thermomechanical detector, determine an intensity of infrared light of a predetermined frequency based on the received electrical signal, and determine a concentration of the analyte in the analyte test chamber based on the determined intensity of infrared light.

Example 22 may include the subject matter of example 21, wherein the metamaterial absorber includes a resonator antenna layer, a dielectric layer under the resonator antenna layer, and a metal ground plane layer under the dielectric layer; wherein the resonator antenna layer includes a plurality of islands, each metal island including a size and/or a geometry based on a desired absorption spectrum linewidth and/or strength.

Example 23 may include the subject matter of example 22, wherein the metamaterial thermomechanical detector includes an optical cavity including two opposing reflective surfaces; a laser configured to emit light towards the optical cavity; and a photodetector configured to detect light and convert light to an electrical signal; wherein the signal analysis circuit including circuitry to receive an electrical signal from the metamaterial thermomechanical detector receives electrical signals from the photodetector, the electrical signals representative of an interference pattern that indicates the intensity and frequency of the vibration of the metamaterial thermomechanical detector; and wherein the signal analysis circuit is configured to determine the concentration of the analyte based in part on the interference pattern.

Example 24 may include the subject matter of example 22, wherein the metamaterial thermomechanical detector includes a first piezoelectric electrode; and a second piezoelectric electrode; and wherein the first piezoelectric electrode and the second piezoelectric electrode are configured to carry electrical charge created from a deformation of the metamaterial thermomechanical detector during vibration; and wherein the electrical charge created from the deformation of the metamaterial thermomechanical detector during vibration is representative of the amplitude and frequency of the vibration, and wherein determining the concentration of the analyte includes determining an intensity of light based on the intensity of the vibration from the electrical charge.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non transitory, computer-readable computer-storage medium for execution by, or to control the operation of, data processing apparatus. Alternatively, or additionally, the program instructions can be encoded in/on an artificially generated propagated signal. For example, the signal can be a machine-generated electrical, optical, or electromagnetic signal that is generated to encode information for transmission to a suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatuses, devices, and machines for processing data, including by way of example, a programmable processor, a computer, or multiple processors or computers. The apparatus can also include special purpose logic circuitry including, for example, a central processing unit (CPU), a field-programmable gate array (FPGA), or an application specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, such as LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory.

Graphics processing units (GPUs) can also be used in combination with CPUs. The GPUs can provide specialized processing that occurs in parallel to processing performed by CPUs. The specialized processing can include artificial intelligence (AI) applications and processing, for example. GPUs can be used in GPU clusters or in multi-GPU computing.

A computer can include, or be operatively coupled to, one or more mass storage devices for storing data. In some implementations, a computer can receive data from, and transfer data to, the mass storage devices including, for example, magnetic, magneto optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer readable media (transitory or non-transitory, as appropriate) suitable for storing computer program instructions and data can include all forms of permanent/non-permanent and volatile/non volatile memory, media, and memory devices. Computer readable media can include, for example, semiconductor memory devices such as random access memory (RAM), read only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer readable media can also include, for example, magnetic devices such as tape, cartridges, cassettes, and internal/removable disks. Computer readable media can also include magneto optical disks and optical memory devices and technologies including, for example, digital video disc (DVD), CD ROM, DVD+/−R, DVD-RAM, DVD-ROM, HD-DVD, and BLURAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated into, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that the user uses. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch-screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations. It should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium.

What is claimed is:

1. An infrared detector comprising:

a tuning fork resonator comprising a mechanical-to-electrical transduction mechanism configured to output an electrical signal, wherein the tuning fork resonator comprises:

a base, a first tine extending from the base, and a second tine extending from the base opposite the first tine;

a metamaterial absorber residing on at least one side of the tuning fork resonator, the metamaterial absorber comprising at least a material layer with subwavelength inclusions, wherein a front surface of the first tine and the second tine are coated with the metamaterial absorber; and a signal processing circuit to translate the electrical signal into an amplitude of mechanical motion of the tuning fork.

2. The infrared detector of claim 1, wherein the mechanical-to-electrical transduction mechanism comprises:

a piezoelectric substrate;

electric contact pads; and electrodes configured to conduct charge from movement of the piezoelectric substrate to the electric contact pads.

3. The infrared detector of claim 1, wherein the mechanical-to-electrical transduction mechanism comprises:

an optically transparent material;

a laser;

a photodetector; and wherein the tuning fork resonator comprises a tine that comprises a partially reflecting mirror.

4. The infrared detector of claim 1, wherein metamaterial absorber comprises:

a metal resonator antenna layer comprising at least one feature smaller than a wavelength of infrared light;

a dielectric layer under the metal resonator antenna layer; and a metal ground plane layer under the dielectric layer.

5. The infrared detector of claim 4, wherein the metal resonator antenna layer is characterized by a broad absorption spectrum.

6. The infrared detector of claim 4, wherein the metal resonator antenna layer is characterized by a narrow absorption spectrum.

7. The infrared detector of claim 1, wherein metamaterial absorber comprises a metal layer comprised of subwavelength nanoparticles.

8. The infrared detector of claim 1, wherein the metamaterial absorber comprises a plurality of islands, each metal island comprising a size and/or a geometry based on a desired absorption spectrum linewidth and/or strength.

9. The infrared detector of claim 8, wherein the plurality of islands comprises dielectric islands.

10. The infrared detector of claim 8, wherein the plurality of islands comprises semiconductor islands.

11. The infrared detector of claim 1, wherein the first and second tines are configured to deform based on a mechanical stress imposed on the tuning fork resonator through absorbed infrared light.

12. The infrared detector of claim 1, further comprising an optical cavity, the optical cavity comprising:

a first optical element on an inner surface of the first tine; and a second optical element on an inner surface of the second tine, the first optical element opposite the second optical element.

13. The infrared detector of claim 12, wherein:

the first optical element comprises a partially reflecting thin metal coating;

the second optical element comprises a partially reflecting thin metal coating;

the infrared detector further comprising:

a laser coupled to an outer surface of the first tine at a location opposite the first optical element; and a photodetector coupled to an outer surface of the second tine at a location opposite the second optical element, the photodetector coupled to an output electrode for communicating a signal from the photodetector, wherein the laser is configured to emit light through the first optical element and the second optical element and onto the photodetector.

14. The infrared detector of claim 12, wherein the first optical element comprises a partially reflecting thin metal coating;

the second optical element comprises a reflecting thin metal coating;

the infrared detector further comprising:

a laser coupled to an outer surface of the first tine at a location opposite the first optical element, the laser is configured to emit light through the first optical element; and a photodetector coupled to the outer surface of the first tine at a location opposite the first optical element, the photodetector coupled to an output electrode for communicating a signal from the photodetector, and the photodetector is configured to receive light reflected from the first optical element and light reflected from the second optical element.

15. The infrared detector of claim 1, further comprising:

a first electrode on the first tine extending from the base; and a second electrode on the second tine extending from the base;

wherein the first electrode and the second electrode carry a charge based on the deformation of the first tine and the second tine.

16. A method comprising:

receiving, from a testing chamber containing an analyte, modulated infrared light at a metamaterial absorber layer of a tuning fork resonator, the modulated infrared light causing the tuning fork resonator to vibrate at a frequency based in part on a modulation frequency of the infrared light and with an intensity corresponding to a concentration of the analyte present in the testing chamber;

receiving an electrical signal representative of the intensity of the vibration of the tuning fork resonator; and determining the concentration of the analyte based on a comparison of the received electrical signal and a reference signal, wherein the electrical signal representative of an intensity of the vibration of the tuning fork resonator comprises an electrical signal generated from a photodetector receiving light reflected from an optical cavity formed on two tines of the tuning fork resonator.

17. The method of claim 16, wherein the electrical signal representative of an intensity of the vibration of the tuning fork resonator comprises an electrical signal generated from a piezoelectric effect, the piezoelectric effect causing charge to flow through an electrode based on a deformation of a tine during vibration of the tuning fork resonator.

18. The method of claim 16, wherein the concentration of the analyte is based in part on an interference pattern detected by the photodetector.

19. The method of claim 18, further comprising:

actuating a laser coupled to a tine of the tuning fork resonator;

detecting, by the photodetector, the light originating from the laser and output from the optical cavity; and determining an amplitude of the vibration of the tuning fork resonator based on the interference pattern detected from the detected light originating from the laser, wherein the intensity of the vibration of the tuning fork corresponds to an intensity of infrared light absorbed by the metamaterial absorber; and determining a concentration of analyte from the intensity of the vibration of the tuning fork.

20. A system comprising:

a metamaterial thermomechanical detector comprising a metamaterial absorber residing on at least one side of the metamaterial thermomechanical detector, wherein the metamaterial thermomechanical detector comprises a tuning fork resonator comprising:

a base, a first tine extending from the base, and a second tine extending from the base opposite the first tine, wherein a front surface of the first tine and the second tine are coated with the metamaterial absorber;

a infrared light emitter;

an analyte test chamber configured to contain an analyte;

an infrared light emitter controller configured to provide a modulation signal for modulating emission of infrared light from the infrared light emitter; and a signal analysis processor comprising hardware circuitry and software, the signal analysis processor configured to:

receive an electrical signal from the metamaterial thermomechanical detector, the electrical signal being representative of a vibrational intensity of the metamaterial thermomechanical detector, determine an intensity of infrared light of a predetermined frequency based on the received electrical signal, and determine a concentration of the analyte in the analyte test chamber based on the determined intensity of infrared light.

21. The system of claim 20, wherein the metamaterial absorber comprises:

a resonator antenna layer, a dielectric layer under the resonator antenna layer, and a metal ground plane layer under the dielectric layer;

wherein the resonator antenna layer comprises a plurality of islands, each metal island comprising a size and/or a geometry based on a desired absorption spectrum linewidth and/or strength.

22. The system of claim 21, wherein the metamaterial thermomechanical detector comprises:

an optical cavity comprising two opposing reflective surfaces;

a laser configured to emit light towards the optical cavity; and a photodetector configured to detect light and convert light to an electrical signal;

wherein the signal analysis circuit comprising circuitry to receive an electrical signal from the metamaterial thermomechanical detector receives electrical signals from the photodetector, the electrical signals being representative of an interference pattern that indicates the intensity and frequency of the vibration of the metamaterial thermomechanical detector; and wherein the signal analysis circuit is configured to determine the concentration of the analyte based in part on the interference pattern.

23. The system of claim 21, wherein the metamaterial thermomechanical detector comprises:

a first piezoelectric electrode; and a second piezoelectric electrode;

wherein the first piezoelectric electrode and the second piezoelectric electrode are configured to carry electrical charge created from a deformation of the metamaterial thermomechanical detector during vibration;

wherein the electrical charge created from the deformation of the metamaterial thermomechanical detector during vibration is representative of an intensity of the vibration, and wherein determining the concentration of the analyte comprises determining an intensity of light based on the intensity of the vibration from the electrical charge.

* * * * *